(12) United States Patent
Li

(10) Patent No.: US 12,720,574 B2
(45) Date of Patent: Aug. 25, 2026

(54) DATA TRANSMISSION METHOD AND APPARATUS

(71) Applicant: Yinwang Intelligent Technologies Co., Ltd., Shenzhen (CN)

(72) Inventor: Jie Li, Shanghai (CN)

(73) Assignee: YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 766 days.

(21) Appl. No.: 18/155,455

(22) Filed: Jan. 17, 2023

(65) Prior Publication Data

US 2023/0156748 A1 May 18, 2023

Related U.S. Application Data

(63) Continuation of application No. PCT/CN2020/102366, filed on Jul. 16, 2020.

(51) Int. Cl.
*H04W 72/30* (2023.01)
*H04L 67/12* (2022.01)

(52) U.S. Cl.
CPC ............. *H04W 72/30* (2023.01); *H04L 67/12* (2013.01)

(58) Field of Classification Search
CPC ............................... H04W 72/30; H04L 67/12
See application file for complete search history.

(56) References Cited

U.S. PATENT DOCUMENTS 9,305,407 B1 * 4/2016 Walton ..................... G08G 1/20
10,452,065 B2 * 10/2019 Xiao .................... G05D 1/0088
10,778,325 B2 * 9/2020 Haley ................ H04B 7/18513
11,190,373 B1 * 11/2021 Stevenson ........... H04L 12/4625
12,379,701 B2 * 8/2025 Oster .................. G05D 1/0297
(Continued)

FOREIGN PATENT DOCUMENTS

CN 1801711 A 7/2006
CN 105144140 A 12/2015
(Continued)

OTHER PUBLICATIONS

Chen Xi Wen et al."Simulation Evaluation of the Time Synchronization Standard IEEE 1588 in Automotive Networks".Research Reports for the Information Processing Society of Japan, System Architecture (ARC), 2019-ARC-235[online], Feb. 7, 2024, 7 pages.
(Continued)

*Primary Examiner* — Blake J Rubin
(74) *Attorney, Agent, or Firm* — Conley Rose, P.C.

(57) ABSTRACT

A data transmission method and an apparatus are applied to a vehicle that includes at least one vehicle integration unit (VIU). A communication connection is established between the at least one VIU and a control device, and the control device and the at least one VIU access a same multicast group. The data transmission method includes: obtaining, by a first VIU, monitored information, where the first VIU is any one of the at least one VIU; and transmitting, by the first VIU, a multicast packet using the multicast group, where the multicast packet includes the information monitored by the first VIU. The control device obtains the multicast packet by monitoring the multicast group, and uses multicast packet to analyze a status of the vehicle.

29 Claims, 22 Drawing Sheets

(56) References Cited

U.S. PATENT DOCUMENTS

2014/0159923 A1 6/2014 Koodli et al.
2015/0281652 A1 10/2015 Morimoto
2017/0332309 A1 11/2017 Chen
2018/0295011 A1* 10/2018 Wang .................. H04L 41/0833
2019/0007511 A1* 1/2019 Rodriguez .............. H04L 67/55
2019/0208420 A1* 7/2019 Lekkas ................. H04W 12/08
2019/0222984 A1* 7/2019 Prabhudeva ............ H04W 4/44
2019/0279440 A1* 9/2019 Ricci ...................... G06Q 10/20
2019/0363843 A1* 11/2019 Gordaychik .......... H04W 28/16
2020/0026290 A1* 1/2020 Lim ..................... G05D 1/0022
2020/0027346 A1* 1/2020 Lisewski .......... G08G 1/096791
2020/0057631 A1* 2/2020 Taniguchi ................. G06F 8/20
2020/0213195 A1* 7/2020 Krieger ............... H04L 12/1881
2020/0344576 A1* 10/2020 Li ........................... H04W 4/06
2020/0396782 A1* 12/2020 Russell ................... H04W 4/50
2021/0006510 A1* 1/2021 Cho ...................... H04L 49/351
2021/0134151 A1* 5/2021 Khalid ................. G08G 1/0145
2021/0144517 A1* 5/2021 Guim Bernat ........ G06F 9/5072
2021/0195669 A1* 6/2021 Cheng ................... H04W 76/14
2021/0203491 A1* 7/2021 Wei ..................... H04W 12/043
2021/0306204 A1* 9/2021 Park ........................ H04L 67/51
2021/0306824 A1* 9/2021 Li ......................... H04W 72/02
2021/0362706 A1 11/2021 Horiguchi et al.
2022/0011749 A1* 1/2022 Lee ....................... H04L 1/1614
2022/0332350 A1* 10/2022 Jha ........................ H04W 4/023
2022/0343241 A1* 10/2022 Jha ......................... G08G 1/166
2023/0231896 A1* 7/2023 Warkentin ............ H04L 12/185
370/400
2023/0300572 A1* 9/2023 Ling ....................... H04W 4/06
370/312
2023/0319514 A1* 10/2023 Kim ........................ H04W 4/08
370/312

FOREIGN PATENT DOCUMENTS

| | | | |
|---|---|---|---|
| CN | 107027104 | A | 8/2017 |
| CN | 208813123 | U | 5/2019 |
| CN | 109905194 | A | 6/2019 |
| CN | 110086891 | A | 8/2019 |
| CN | 111181829 | A | 5/2020 |
| JP | 2004128853 | A | 4/2004 |
| JP | 2007235313 | A | 9/2007 |
| JP | 2020045024 | A | 3/2020 |
| KR | 20200071256 | A | 6/2020 |
| WO | 2014109039 | A1 | 7/2014 |

OTHER PUBLICATIONS

Bengtsson, H., et al., "TSN ethernetas corenetworkin the centralizedE/E architecture-Challenges and possible solution," 2019 IEEE/SA Ethernet/IP @ AutomativeTechnologyDay Detroit, Sep. 2019, 15 pages.

Hoang Bengtsson Hoai, Hiller Martin, Sigfridsson Samuel: "TSN ethernet as core network in the centralized E/E architecture—Challenges and possible solution", 2019 IEEE/SA Ethernet/IP@ Automative Technology Day Detroit, Sep. 1, 2019 (Sep. 1, 2019), XP055887587, Total 15 Pages.

* cited by examiner

DATA TRANSMISSION METHOD AND APPARATUS

CROSS-REFERENCE TO RELATED APPLICATIONS

This is a continuation of International Patent Application No. PCT/CN2020/102366 filed on Jul. 16, 2020, the disclosure of which is hereby incorporated by reference in its entirety.

TECHNICAL FIELD

This application relates to the vehicle field, and in particular, to a data transmission method and an apparatus.

BACKGROUND

With development of vehicle technologies, a demand for intelligent vehicles gradually increases. Modules inside a frequently-used vehicle are connected and communicate with each other through a Controller Area Network (CAN) bus, so that information about the modules inside the vehicle is analyzed or monitored through the CAN bus.

However, a bandwidth of the CAN bus is relatively low, and due to the bandwidth limitation, transmission efficiency of the information data of the modules inside the vehicle is low. Therefore, how to increase a transmission speed of information inside the vehicle becomes an urgent problem to be resolved.

SUMMARY

Embodiments of this application provide a data transmission method and an apparatus, to quickly and accurately complete an instant snapshot of a vehicle and status monitoring for the vehicle.

In view of this, according to a first aspect, this application provides a data transmission method, applied to a vehicle. The vehicle includes at least one vehicle integration unit (VIU), a communication connection is established between the at least one VIU and a control device, and the control device and the at least one VIU access a same multicast group. The method includes: A first VIU obtains monitored information, where the first VIU is any one of the at least one VIU. The first VIU transmits a multicast packet by using the multicast group, where the multicast packet includes the information detected by the first VIU, so that the control device obtains the multicast packet by monitoring the multicast group, and the multicast packet is used by the control device to analyze a status of the vehicle.

Therefore, in the method provided in this application, a communication connection may be established for one or more VIUs in the vehicle and a multicast group may be established to transmit a multicast packet in the multicast group, so a snapshot of the vehicle is transmitted. And a snapshot of the vehicle can be transmitted quickly through a high-speed-high-efficiency transmission in a communications network such as the Ethernet or a wireless network. The control device can quickly receive, by monitoring the multicast group, the multicast packet sent by the VIU, to analyze the status of the vehicle by using received one or more frames of multicast packets. This improves efficiency of receiving, by the control device, the information monitored by the VIU.

In a possible implementation, the communications network may include wired communication or wireless communication, that is, an Ethernet connection or a wireless communication connection is established between the control device and the at least one VIU. That the first VIU transmits a multicast packet by using the multicast group may include: The first VIU transmits the multicast packet in the multicast group through the Ethernet connection or the wireless connection.

A speed of each of the Ethernet and the wireless network is far higher than a transmission speed of a CAN. Therefore, in this implementation of this application, VIUs or the VIU and the control device may be connected to each other through the Ethernet and/or the wireless network, and form the multicast group based on the Ethernet and/or the wireless network, to implement efficient transmission of the information monitored by the VIU, so that the control device can efficiently obtain, by using the multicast group, the information monitored by the VIU, so as to complete analysis of the status of the vehicle.

In a possible implementation, the vehicle includes at least two VIUs, and before the first VIU transmits the multicast packet to the multicast group, the method may further include: The first VIU performs time synchronization with a VIU in the at least two VIUs other than the first VIU. That the first VIU transmits a multicast packet to the multicast group may include: The first VIU sends the multicast packet based on a time axis obtained after the time synchronization.

In this implementation of this application, VIUs may perform time synchronization periodically or before the VIUs transmit data. Therefore, the VIU can transmit a multicast packet based on the time axis obtained after the synchronization, and each VIU in the vehicle can synchronously transmit a multicast packet, or mark a timestamp or the like after the time synchronization is performed on the multicast packet, so that the control device can obtain an instant snapshot of the vehicle.

In a possible implementation, that the first VIU transmits a multicast packet to the multicast group includes: The first VIU periodically sends the multicast packet. In this implementation of this application, the VIU may periodically send the multicast packet, so that the control device can monitor the status of the vehicle.

In a possible implementation, the information monitored by the first VIU includes one or more of the following: status information of the first VIU, information about an input/output (I/O) interface of the first VIU, an original sampling value of an analog-to-digital converter (ADC) of the first VIU, or information collected by a sensor monitored by the first VIU.

Therefore, in this implementation of this application, the VIU may transmit, to the multicast group, the status information of the VIU, the information about the I/O interface, the original sampling value of the ADC, or the information collected by the sensor, so that the control device can monitor the status of the vehicle by using the multicast packet transmitted in the multicast group.

In a possible implementation, the information collected by the sensor is used by the control device to plan a travel path for the vehicle. Therefore, in this implementation of this application, on the premise that efficient communication is performed in the multicast group established based on the Ethernet or the wireless network, the control device can efficiently and quickly plan the travel path for the vehicle by using the information collected by the sensor, so that the vehicle can more accurately and quickly determine the travel path. This improves vehicle safety.

In a possible implementation, before the first VIU transmits the multicast packet to the multicast group, the method further includes: The first VIU receives a join request sent by the control device, where the join request is used to request to join the multicast group. The first VIU replies to the join request with a multicast address, so that the control device joins the multicast group based on the multicast address, monitors a port corresponding to the multicast address, and receives the multicast packet.

Therefore, in this implementation of this application, the control device may request to join the multicast group from the VIU, to obtain permission to monitor the multicast group, monitor the port corresponding to the multicast address, and receive the multicast packet.

In a possible implementation, the method may further include: The first VIU receives a control instruction sent by the control device. The first VIU controls one or more of the I/O interface of the first VIU, the sensor, or an executor of the vehicle according to the control instruction.

Therefore, in this implementation of this application, the control device can efficiently and accurately control the I/O interface of the VIU, the sensor, the executor of the vehicle, or the like. When the control device is connected to the VIU through the wireless network, the control device can remotely control the vehicle. This improves user experience.

According to a second aspect, this application provides a data transmission method, applied to a vehicle. The vehicle includes at least one vehicle integration unit VIU, a communication connection is established between the at least one VIU and a control device, and the control device and the at least one VIU access a same multicast group. The method includes: The control device obtains a multicast address of the multicast group. The control device monitors a port corresponding to the multicast address, and obtains at least one frame of multicast packet through the port, where the multicast packet includes information monitored by a first VIU in the at least one VIU, and the first VIU is any one of the at least one VIU. The control device analyzes a status of the vehicle by using the at least one frame of multicast packet.

Therefore, in the method provided in this application, a communication connection may be established for one or more VIUs in the vehicle, and a multicast group may be established to transmit a multicast packet in the multicast group, so a snapshot of the vehicle is transmitted. And the snapshot of the vehicle can be transmitted quickly through a high-speed-with-high-efficiency transmission in a communications network such as the Ethernet or a wireless network. The control device can quickly receive, by monitoring the multicast group, the multicast packet sent by the VIU, to analyze the status of the vehicle by using received one or more frames of multicast packets. This improves efficiency of receiving, by the control device, the information monitored by the VIU.

In a possible implementation, an Ethernet connection or a wireless connection is established between the control device and the at least one VIU. The control device may receive, through the Ethernet connection and/or the wireless connection, the multicast packet transmitted in the multicast group.

A speed of each of the Ethernet and the wireless network is far higher than a transmission speed of a CAN. Therefore, in this implementation of this application, VIUs or the VIU and the control device may be connected to each other through the Ethernet and/or the wireless network, and form the multicast group based on the Ethernet and/or the wireless network, to implement efficient transmission of the information monitored by the VIU, so that the control device can efficiently obtain, by using the multicast group, the information monitored by the VIU, so as to complete analysis of the status of the vehicle.

In a possible implementation, the at least one frame of multicast packet includes one or more of the following: status information of the at least one VIU, information about an I/O interface of the at least one VIU, an original sampling value of an ADC of the at least one VIU, or information collected by a sensor monitored by the at least one VIU.

Therefore, in this implementation of this application, the VIU may transmit, to the multicast group, the status information of the VIU, the information about the I/O interface, the original sampling value of the ADC, or the information collected by the sensor, so that the control device can monitor the status of the vehicle by using the multicast packet transmitted in the multicast group.

In a possible implementation, when the at least one frame of multicast packet includes the information collected by the sensor monitored by the at least one VIU, the method further includes: The control device plans a travel path for the vehicle based on the information collected by the sensor monitored by the at least one VIU. Therefore, in this implementation of this application, on the premise that efficient communication is performed in the multicast group established based on the Ethernet or the wireless network, the control device can efficiently and quickly plan the travel path for the vehicle by using the information collected by the sensor, so that the vehicle can more accurately and quickly determine the travel path. This improves vehicle safety.

In a possible implementation, that at least one frame of multicast packet is obtained through the port may include: The control device periodically receives, through the port, the at least one frame of multicast packet transmitted by the at least one VIU to the multicast group. In this implementation of this application, the VIU may periodically send the multicast packet, so that the control device can monitor the status of the vehicle.

In a possible implementation, that the control device obtains a multicast address of the multicast group may include: The control device sends a join request to the first VIU, where the join request is used to request to join the multicast group. The control device receives the multicast address with which the first VIU replies.

Therefore, in this implementation of this application, the control device may request to join the multicast group from the VIU, to obtain permission to monitor the multicast group, monitor the port corresponding to the multicast address, and receive the multicast packet.

In a possible implementation, after the control device analyzes the status of the vehicle by using the at least one frame of multicast packet, the method further includes: The control device generates an analysis image based on a change of the status of the vehicle with time, and displays the analysis image.

Therefore, in this implementation of this application, the control device may generate and display the analysis image indicating the change of the status of the vehicle with time, so that a user can intuitively observe the status of the vehicle by using the analysis image.

In a possible implementation, the method may further include: The control device sends a control instruction to the at least one VIU, where the control instruction is used to control one or more of the I/O interface of the at least one VIU, the sensor, or an executor.

Therefore, in this implementation of this application, the control device can efficiently and accurately control the I/O interface of the VIU, the sensor, the executor of the vehicle, or the like. When the control device is connected to the VIU through the wireless network, the control device can remotely control the vehicle. This improves user experience.

According to a third aspect, this application provides an electronic device. The electronic device includes a display screen, a memory, and one or more processors. The one or more processors are configured to execute one or more computer programs stored in the memory. The memory stores code of a graphical user interface (GUI). The one or more processors are configured to execute the code that is of the GUI and that is stored in the memory, so that the display screen displays the graphical user interface stored in the memory. The graphical user interface includes: displaying a multicast address of a multicast group on the display screen, where the multicast group includes at least one VIU; and in response to an acknowledgment operation for the multicast address and receiving of at least one frame of multicast packet transmitted by the at least one VIU in the multicast group, displaying, on the display screen, information included in the at least one frame of multicast packet.

In a possible implementation, the graphical user interface may specifically include: displaying one or more of status information of the at least one VIU, information about an I/O interface of the at least one VIU, an original sampling value of an ADC of the at least one VIU, or information collected by a sensor monitored by the at least one VIU.

In a possible implementation, the graphical user interface may specifically include: displaying an analysis image in response to generation of the analysis image based on a change of a status of a vehicle with time.

According to a fourth aspect, this application provides an vehicle integration unit VIU, applied to a vehicle. The vehicle includes at least one vehicle integration unit VIU, the VIU is any one of the at least one VIU, a communication connection is established between the at least one VIU and a control device, and the control device and the at least one VIU access a same multicast group. The VIU includes: a monitoring module, configured to obtain monitored information; and a transceiver module, configured to transmit a multicast packet by using the multicast group, so that the control device obtains the multicast packet by monitoring the multicast group, where the multicast packet includes the information detected by the first VIU, and the multicast packet is used by the control device to analyze a status of the vehicle.

For beneficial effects generated in any one of the fourth aspect or the possible implementations of the fourth aspect, refer to the descriptions of any one of the first aspect or the possible implementations of the first aspect.

In a possible implementation, an Ethernet connection and/or a wireless communication connection is established between the control device and the at least one VIU.

The transceiver module is specifically configured to transmit the multicast packet in the multicast group through the Ethernet connection and/or the wireless connection.

In a possible implementation, the vehicle includes at least two VIUs, and before the first VIU transmits the multicast packet to the multicast group, the VIU further includes a synchronization module, configured to perform time synchronization with a VIU in the at least two VIUs other than the VIU.

The transceiver module is specifically configured to send the multicast packet based on a time axis obtained after the time synchronization.

In a possible implementation, the transceiver module is specifically configured to periodically send the multicast packet.

In a possible implementation, the information monitored by the monitoring module includes one or more of the following: status information of the VIU, information about an I/O interface of the VIU, an original sampling value of an ADC of the VIU, or information collected by a sensor monitored by the VIU.

In a possible implementation, the information collected by the sensor is used by the control device to plan a travel path for the vehicle.

In a possible implementation, before the transceiver module transmits the multicast packet to the multicast group, the transceiver module is further configured to: receive a join request sent by the control device, where the join request is used to request to join the multicast group; and reply to the join request with a multicast address, so that the control device joins the multicast group based on the multicast address, monitors a port corresponding to the multicast address, and receives the multicast packet.

In a possible implementation, the VIU may further include a control module. The transceiver module is further configured to receive a control instruction sent by the control device. The control module is configured to control one or more of the I/O interface of the first VIU, the sensor, or an executor of the vehicle according to the control instruction.

According to a fifth aspect, this application provides a control device, applied to a vehicle. The vehicle includes at least one vehicle integration unit VIU, a communication connection is established between the at least one VIU and the control device, and the control device and the at least one VIU access a same multicast group. The control device includes: a transceiver module, configured to obtain a multicast address of the multicast group; a monitoring module, configured to monitor, by the control device, a port corresponding to the multicast address, where the transceiver module is further configured to obtain at least one frame of multicast packet through the port, where the multicast packet includes information monitored by a first VIU in the at least one VIU, and the first VIU is any one of the at least one VIU; and a processing module, configured to analyze a status of the vehicle by using the at least one frame of multicast packet.

For beneficial effects generated in any one of the fifth aspect or the possible implementations of the fifth aspect, refer to the descriptions of any one of the second aspect or the possible implementations of the second aspect.

In a possible implementation, an Ethernet connection and/or a wireless connection is established between the control device and the at least one VIU.

The transceiver module is specifically configured to receive, through the Ethernet connection and/or the wireless connection, the multicast packet transmitted in the multicast group.

In a possible implementation, the at least one frame of multicast packet includes one or more of the following: status information of the at least one VIU, information about an I/O interface of the at least one VIU, an original sampling value of an ADC of the at least one VIU, or information collected by a sensor monitored by the at least one VIU.

In a possible implementation, when the at least one frame of multicast packet includes the information collected by the sensor monitored by the at least one VIU, the processing module is further configured to plan, by the control device, a travel path for the vehicle based on the information collected by the sensor monitored by the at least one VIU.

In a possible implementation, the transceiver module is specifically configured to periodically receive, through the port, the at least one frame of multicast packet transmitted by the at least one VIU to the multicast group.

In a possible implementation, the transceiver module is further configured to: send a join request to the first VIU, where the join request is used to request to join the multicast group, and the first VIU is any one of the at least one VIU; and receive the multicast address with which the first VIU replies.

In a possible implementation, the control device further includes a display module.

After the control device analyzes the status of the vehicle by using the at least one frame of multicast packet, the processing module is further configured to generate an analysis image based on a change of the status of the vehicle with time; and the display module is configured to display the analysis image.

In a possible implementation, the transceiver module is further configured to send a control instruction to the at least one VIU, where the control instruction is used to control one or more of the I/O interface of the at least one VIU, the sensor, or an executor.

According to a sixth aspect, an embodiment of this application provides a VIU. The VIU has a function of implementing the data transmission method according to the first aspect. The function may be implemented by hardware, or may be implemented by hardware executing corresponding software. The hardware or the software includes one or more modules corresponding to the foregoing function.

According to a seventh aspect, an embodiment of this application provides a control device, including a processor and a memory. The processor and the memory are interconnected through a line, and the processor invokes program code in the memory to perform a processing-related function in the data transmission method according to any one of the first aspect.

According to an eighth aspect, an embodiment of this application provides a data transmission apparatus. The data transmission apparatus may also be referred to as a digital processing chip or a chip. The chip includes a processing unit and a communications interface. The processing unit obtains program instructions through the communications interface, and when the program instructions are executed by the processing unit, the processing unit is configured to perform a processing-related function according to any one of the first aspect or the optional implementations of the first aspect.

According to a ninth aspect, an embodiment of this application provides a computer readable storage medium, including instructions. When the instructions are run on a computer, the computer is enabled to perform the method according to any one of the first aspect or the optional implementations of the first aspect or any one of the second aspect or the optional implementations of the second aspect.

According to a tenth aspect, an embodiment of this application provides a computer program product including instructions. When the computer program product runs on a computer, the computer is enabled to perform the method according to any one of the first aspect or the optional implementations of the first aspect or any one of the second aspect or the optional implementations of the second aspect.

According to an eleventh aspect, this application provides a vehicle. The vehicle includes at least one VIU, a communication connection is established between the at least one VIU and a control device, and the control device and the at least one VIU access a same multicast group. The at least one VIU is configured to perform the method according to any one of the first aspect or the optional implementations of the first aspect, and the control device is configured to perform the method according to any one of the second aspect or the optional implementations of the second aspect.

According to a twelfth aspect, this application provides a data transmission system, including a control device and at least one VIU. a communication connection is established between the at least on VIU and the control device, and the control device and the at least one VIU access a same multicast group. The at least one VIU is configured to perform the method according to any one of the first aspect or the optional implementations of the first aspect, and the control device is configured to perform the method according to any one of the second aspect or the optional implementations of the second aspect.

DESCRIPTION OF EMBODIMENTS

The following describes the technical solutions in the embodiments of this application with reference to the accompanying drawings in the embodiments of this application. It is clear that the described embodiments are merely some but not all of the embodiments of this application. All other embodiments obtained by a person skilled in the art based on the embodiments of this application without creative efforts shall fall within the protection scope of this application.

A data transmission method provided in the embodiments of this application may be applied to various vehicle-related scenarios, for example, a scenario in which a travel path is planned for a vehicle, a scenario in which a status of a vehicle is monitored, or a scenario in which a vehicle is remotely controlled. In addition, this application may also be applied to a scenario in which travel paths are planned for various robots such as a freight robot, a detection robot, a sweeping robot, and another type of robot, a scenario in which a status of a vehicle is monitored, a scenario in which a vehicle is remotely controlled, or the like. The freight robot is used as an example herein to further describe an application scenario. During transportation, the freight robot can monitor a status of the freight robot in real time, plan a transportation path for the freight robot, remotely control the freight robot, or the like, to safely and stably complete the transportation.

The following describes the embodiments of this application with reference to the accompanying drawings. A person of ordinary skill in the art may learn that as a technology develops and a new scenario emerges, the technical solutions provided in the embodiments of this application are also applicable to similar technical problems.

Figure 1:
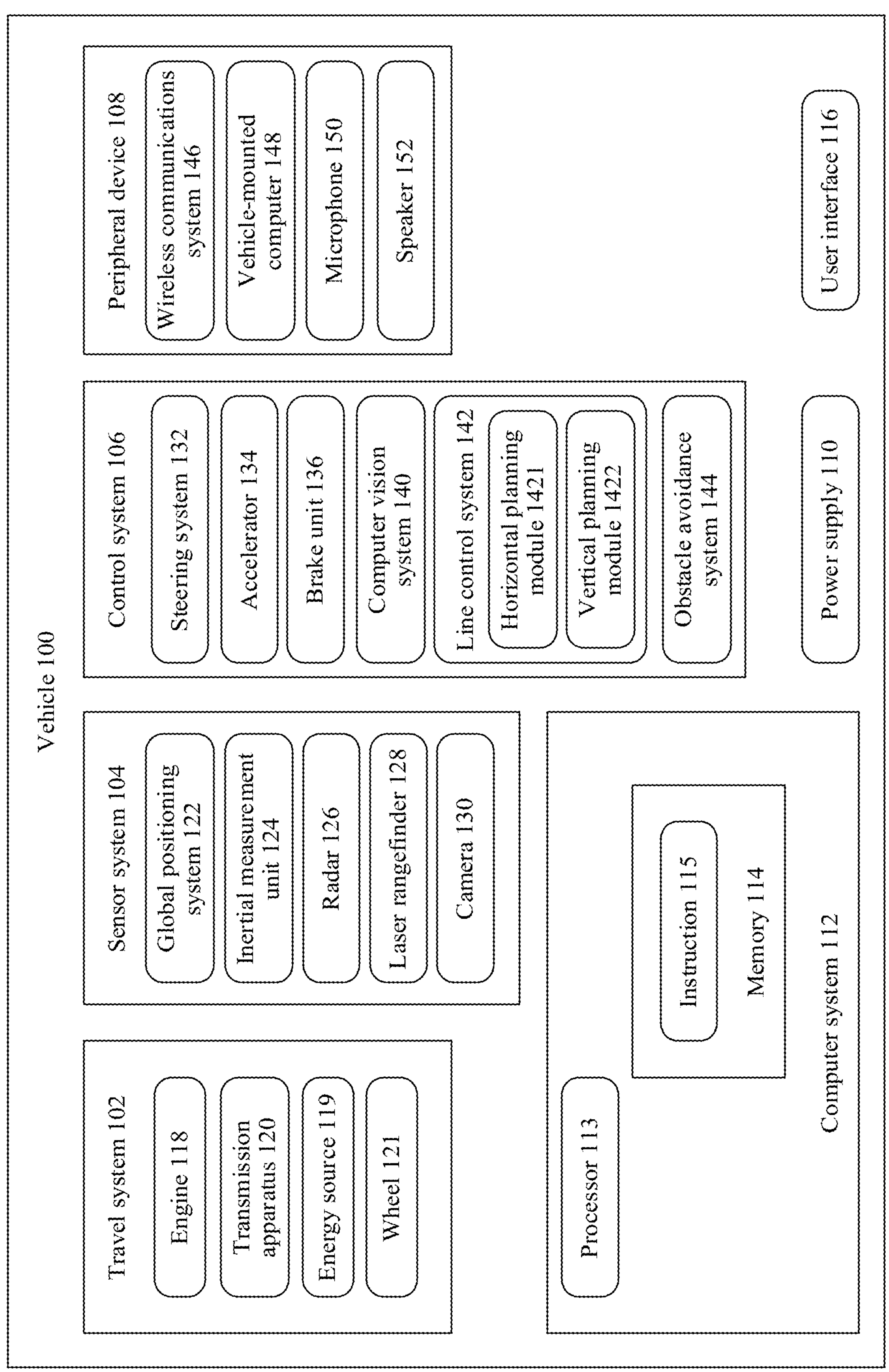
FIG. 1 is a schematic structural diagram of a vehicle according to an embodiment of this application.

To facilitate understanding of this solution, in the embodiments of this application, a structure of a vehicle provided in this application is first described with reference to FIG. 1. FIG. 1 is a schematic structural diagram of a vehicle according to an embodiment of this application. The vehicle 100 may be configured to be in an autonomous driving mode. For example, the vehicle 100 may control the vehicle 100 when the vehicle 100 is in the autonomous driving mode, determine current statuses of the vehicle and an ambient environment of the vehicle through a manual operation, determine whether an obstacle exists in the ambient environment, and control the vehicle 100 based on information about the obstacle. When the vehicle 100 is in the autonomous driving mode, the vehicle 100 may also be set to operate without interacting with a person.

The vehicle 100 may include various subsystems, for example, a travel system 102, a sensor system 104, a control system 106, one or more peripheral devices 108, a power supply 110, a computer system 112, and a user interface 116. Optionally, the vehicle 100 may include more or fewer subsystems, and each subsystem may include a plurality of components. In addition, each subsystem and component of the vehicle 100 may be interconnected in a wired or wireless manner.

The travel system 102 may include a component that provides driving force for the vehicle 100 to move. In an embodiment, the travel system 102 may include an engine 118, an energy source 119, a transmission apparatus 120, and a wheel/tire 121.

The engine 118 may be an internal combustion engine, an electric motor, an air compression engine, or a combination of other types of engines, for example, a hybrid engine including a gasoline engine and an electric motor, or a hybrid engine including an internal combustion engine and an air compression engine. The engine 118 converts the energy source 119 into mechanical energy. Examples of the energy source 119 include gasoline, diesel, other oil-based fuels, propane, other compressed gas-based fuels, ethanol, solar panels, batteries, and other power sources. The energy source 119 may also provide energy for another system of the vehicle 100. The transmission apparatus 120 may transmit mechanical power from the engine 118 to the wheel 121. The transmission apparatus 120 may include a gearbox, a differential, and a drive shaft. In an embodiment, the transmission apparatus 120 may further include another component, for example, a clutch. The drive shaft may include one or more shafts that may be coupled to one or more wheels 121.

The sensor system 104 may include several sensors that sense information about an ambient environment of the vehicle 100. For example, the sensor system 104 may include a positioning system 122 (where the positioning system may be a Global Positioning System (GPS), a BeiDou system, or another positioning system), an inertial measurement unit (IU) 124, radar 126, a laser rangefinder 128, and a camera 130. The sensor system 104 may further include sensors (for example, an in-vehicle air quality monitor, a fuel gauge, and an oil temperature gauge) in an internal system of the monitored vehicle 100. One or more pieces of sensor data from these sensors may be used to detect objects and corresponding features (a location, a shape, a direction, a speed, and the like) of the objects. Such detection and identification are key functions of a safe operation of the autonomous vehicle 100. A sensor mentioned in the following implementations of this application may be the radar 126, the laser rangefinder 128, the camera 130, or the like.

The positioning system 122 may be configured to estimate a geographical location of the vehicle 100. The IMU 124 is configured to sense a location and an orientation change of the vehicle 100 based on inertial acceleration. In an embodiment, the IMU 124 may be a combination of an accelerometer and a gyroscope. The radar 126 may sense an object in the ambient environment of the vehicle 100 by using a radio signal, and may be specifically represented as millimeter-wave radar or laser radar. In some embodiments, in addition to sensing the object, the radar 126 may be further configured to sense a speed and/or a moving direction of the object. The laser rangefinder 128 may sense, by using a laser, an object in an environment in which the vehicle 100 is located. In some embodiments, the laser rangefinder 128 may include one or more laser sources, a laser scanner, one or more detectors, and another system component. The camera 130 may be configured to capture a plurality of images of the ambient environment of the vehicle 100. The camera 130 may be a static camera or a video camera.

The control system 106 controls operations of the vehicle 100 and the components of the vehicle 100. The control system 106 may include various components, including a steering system 132, an accelerator 134, a brake unit 136, a computer vision system 140, a line control system 142, and an obstacle avoidance system 144.

The steering system 132 may operate to adjust a moving direction of the vehicle 100. For example, in an embodiment, the steering system 132 may be a steering wheel system. The accelerator 134 is configured to control an operating speed of the engine 118 and further control a speed of the vehicle 100. The brake unit 136 is configured to control the vehicle 100 to decelerate. The brake unit 136 may use friction to reduce a rotational speed of the wheel 121. In another embodiment, the brake unit 136 may convert kinetic energy of the wheel 121 into an electric current. The brake unit 136 may alternatively use another manner to reduce a rotational speed of the wheel 121, to control the speed of the vehicle 100. The computer vision system 140 may operate to process and analyze an image captured by the camera 130 to identify objects and/or features in the ambient environment of the vehicle 100. The objects and/or the features may include a traffic signal, a road boundary, and an obstacle. The computer vision system 140 may use an object recognition algorithm, a structure from motion (SFM) algorithm, video tracking, and another computer vision technology. In some embodiments, the computer vision system 140 may be configured to: draw a map for an environment, track an object, estimate a speed of the object, and the like. The line control system 142 is configured to determine a driving route and a driving speed of the vehicle 100. In some embodiments, the line control system 142 may include a horizontal planning module 1421 and a vertical planning module 1422. The horizontal planning module 1421 and the vertical planning module 1422 are respectively configured to determine the driving route and the driving speed of the vehicle 100 based on data from the obstacle avoidance system 144, the GPS 122, and one or more predetermined maps. The obstacle avoidance system 144 is configured to: identify, evaluate, and avoid, or pass, in another manner, obstacles in the environment of the vehicle 100. The obstacles may be specifically represented as an actual obstacle and a virtual moving body that may collide with the vehicle 100. In an instance, the control system 106 may be equipped with or alternatively include a component other than those shown and described. Alternatively, the control system 106 may not be equipped with some of the components shown above.

The vehicle 100 interacts with an external sensor, another vehicle, another computer system, or a user by using the peripheral device 108. The peripheral device 108 may include a wireless data transmission system 146, a vehicle-mounted computer 148, a microphone 150, and/or a speaker 152. In some embodiments, the peripheral device 108 provides a means for a user of the vehicle 100 to interact with the user interface 116. For example, the vehicle-mounted computer 148 may provide information for the user of the vehicle 100. The user interface 116 may be further used to operate the vehicle-mounted computer 148 to receive a user input. An operation may be performed on the vehicle-mounted computer 148 through a touchscreen. In another case, the peripheral device 108 may provide a means for the vehicle 100 to communicate with another device located in the vehicle. For example, the microphone 150 may receive audio (for example, a voice command or another audio input) from the user of the vehicle 100. Similarly, the speaker 152 may output audio to the user of the vehicle 100. The wireless data transmission system 146 may wirelessly communicate with one or more devices directly or through a communications network. For example, the wireless data transmission system 146 may perform communication through a 3G cellular network such as a code division multiple access (CDMA), EVDO, a GSM/GPRS, perform communication through a 4G cellular network such as LTE, or perform communication through a 5G cellular network. The wireless data transmission system 146 may communicate through a wireless local area network (WLAN). In some embodiments, the wireless data transmission system 146 may directly communicate with a device through an infrared link, Bluetooth, or ZigBee. Other wireless protocols, for example, various vehicle data transmission systems such as the wireless data transmission system 146, may include one or more dedicated short-range communications (DSRC) devices. Communication between these devices may include public and/or private data communication between vehicles, between roadside stations, or between a vehicle and a roadside station.

The power supply 110 may supply power to various components of the vehicle 100. In an embodiment, the power supply 110 may be a rechargeable lithium-ion or lead-acid battery. One or more battery packs of such a battery may be configured as the power supply to supply power to the components of the vehicle 100. In some embodiments, the power supply 110 and the energy source 119 may be implemented together, for example, in some pure electric vehicles.

Some or all functions of the vehicle 100 are controlled by the computer system 112. The computer system 112 may include at least one processor 113. The processor 113 executes an instruction 115 stored in a non-transitory computer readable medium such as a memory 114. The computer system 112 may alternatively be a plurality of computing devices that control an individual component or a subsystem of the vehicle 100 in a distributed manner. The processor 113 may be any conventional processor, such as a commercially available central processing unit (CPU). Optionally, the processor 113 may be a dedicated device such as an application-specific integrated circuit (ASIC) or another hardware-based processor. Although FIG. 1 functionally illustrates the processor, the memory, and another component of the computer system 112 in a same block, a person of ordinary skill in the art should understand that the processor or the memory may actually include a plurality of processors or memories that are not located in a same physical housing. For example, the memory 114 may be a hard disk drive or another storage medium located in a housing different from that of the computer system 112. Therefore, a reference to the processor 113 or the memory 114 is understood as a reference to a set of processors or memories that may or may not operate concurrently. Different from using a single processor to perform the steps described herein, some components such as a steering component and a deceleration component each may include a respective processor. The processor performs only computation related to a component-specific function.

In various aspects described herein, the processor 113 may be located far away from the vehicle 100 and wirelessly communicate with the vehicle 100. In other aspects, some of the processes described herein are performed by the processor 113 disposed inside the vehicle 100, while others are performed by a remote processor 113. The processes include necessary steps for performing a single operation.

In some embodiments, the memory 114 may include the instruction 115 (for example, program logic), and the instruction 115 may be executed by the processor 113 to perform various functions of the vehicle 100, including the functions described above. The memory 114 may also include additional instructions, including instructions used to send data to, receive data from, interact with, and/or control one or more of the travel system 102, the sensor system 104, the control system 106, and the peripheral device 108. In addition to the instruction 115, the memory 114 may further store data, such as a road map, route information, a location, a direction, a speed, and other vehicle data of the vehicle, and other information. Such information may be used by the vehicle 100 and the computer system 112 when the vehicle 100 operates in an autonomous mode, a semi-autonomous mode, and/or a manual mode. The user interface 116 is configured to: provide information for or receive information from the user of the vehicle 100. Optionally, the user interface 116 may include one or more input/output devices in a set of peripheral devices 108, for example, the wireless data transmission system 146, the vehicle-mounted computer 148, the microphone 150, or the speaker 152.

The computer system 112 may control functions of the vehicle 100 based on inputs received from various subsystems (for example, the travel system 102, the sensor system 104, and the control system 106) and from the user interface 116. For example, the computer system 112 may communicate with another system or component in the vehicle 100 through a CAN bus. For example, the computer system 112 may use an input from the control system 106 to control the steering system 132 to avoid an obstacle detected by the sensor system 104 or the obstacle avoidance system 144. In some embodiments, the computer system 112 may operate to provide control over many aspects of the vehicle 100 and the subsystems of the vehicle 100.

Optionally, one or more of the foregoing components may be installed separately from or associated with the vehicle 100. For example, the memory 114 may exist partially or completely separate from the vehicle 100. The foregoing components may be communicatively coupled together in a wired and/or wireless manner.

Optionally, the foregoing components are merely examples. In actual application, components in the foregoing modules may be added or removed based on an actual requirement. FIG. 1 should not be understood as a limitation on this embodiment of this application. The data transmission method provided in this application may be performed by the computer system 112, the radar 126, the laser rangefinder 128, or a peripheral device such as the vehicle-mounted computer 148 or another vehicle-mounted terminal. For example, the data transmission method provided in this application may be performed by the vehicle-mounted computer 148. The vehicle-mounted computer 148 may plan a travel path and a corresponding speed curve for the vehicle, generate a control instruction based on the travel path, and send the control instruction to the computer system 112. The computer system 112 controls the steering system 132, the accelerator 134, the brake unit 136, the computer vision system 140, the line control system 142, the obstacle avoidance system 144, or the like in the control system 106 of the vehicle, to implement autonomous driving of the vehicle.

The vehicle 100 may be a car, a truck, a motorcycle, a bus, a boat, an airplane, a helicopter, a lawn mower, a recreational vehicle, a playground vehicle, a construction device, a trolley, a golf cart, a train, a handcart, or the like. This is not specifically limited in this embodiment of this application.

Figure 2:
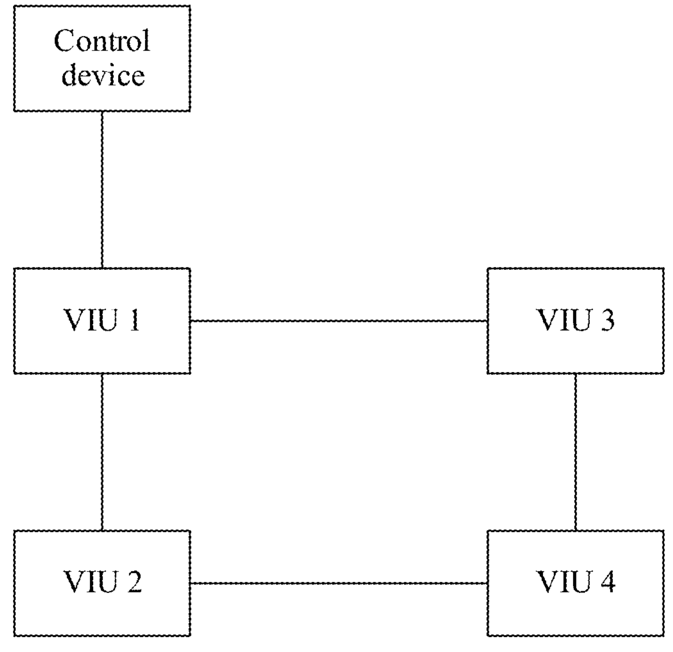
FIG. 2 is a schematic structural diagram of a data transmission system according to this application.

This application further provides a data transmission system. The data transmission system may include a control device and at least one VIU. For example, as shown in FIG. 2, a central computing architecture (CCA) platform may be configured for the vehicle. The vehicle may include one or more VIUs. The one or more VIUs are connected to the control device. The control device may be included inside the vehicle, or may be disposed outside the vehicle. Communication connections may be established between the control device and the one or more VIUs, and the one or more VIUs and the control device access a same multicast group. The multicast group is a network including a plurality of nodes. In an implementation of this application, the node may be a VIU, the control device, or the like. For example, three VIUs may form a multicast group, and a tablet computer may access the multicast group. Then, the multicast group includes the three VIUs and the tablet computer. It should be understood that four VIUs (a VIU 1, a VIU 2, a VIU 3, and a VIU 4) shown in FIG. 2 and four VIUs shown in the following embodiments of this application are merely used as examples for description. The vehicle may include more or fewer VIUs. This is not limited in this application.

It should be understood that the one or more VIUs are included inside the vehicle. For example, the VIU may monitor or control all or some modules or apparatuses in the control system 106, the travel system 102, the sensor system 104, or the like.

The VIU in the vehicle may include one or more components (for example, all or some components in the travel system 102, all or some components in the control system, one or more components in the sensor system, or an independent component). The VIU may be configured to: monitor a status of the VIU, monitor a status of a sensor or another component connected to the VIU, obtain information collected by a component included inside the VIU or a component connected to the VIU, or the like. For example, the vehicle may be divided into a plurality of domains based on an internal hardware structure of the vehicle, a plurality of VIUs are configured for the vehicle, each domain may correspond to one VIU, and each VIU is configured to: monitor a status of the VIU, collect information about hardware that is in a domain and that is managed by the VIU, or the like.

The VIU in the vehicle and the control device access the same multicast group and transmit data by using the multicast group. The VIU or the control device may be used as a node in the multicast group. The node that accesses the multicast group may obtain, by monitoring a port corresponding to the multicast group, data sent by another node, or may send data to another node in the multicast group through a port corresponding to the multicast group. A network topology including the nodes in the multicast group may include a tree topology, a ring topology, a linear topology, or the like, and may be specifically adjusted based on an actual application scenario.

The control device and the one or more VIUs may be connected to each other through a wired communications network or a wireless communications network. For example, the wired communications network may include but is not limited to a network such as an optical transport network (OTN), a synchronous digital hierarchy (SDH), a passive optical network (PON), the Ethernet, or Flexible Ethernet (FlexE). The wireless network includes but is not limited to any one or more of a 5th generation (5G) mobile communications technology system, a Long-Term Evolution (LTE) system, a Global System for Mobile Communications (GSM), a CDMA network, a wideband code division multiple access (WCDMA) network, Wi-Fi, Bluetooth, ZigBee, a radio frequency identification (RFID) technology, long range (Lora) wireless communication, and near-field communication (NFC). The Ethernet mentioned in the following implementations of this application may specifically include the Ethernet or FlexE. Therefore, in the vehicle provided in this application, a connection through the wired communications network or the wireless communications network may be established for the VIU, so the VIU can quickly transmit data monitored by the VIU. Compared with a case in which the vehicle transmits data through a CAN bus, in this application, the vehicle can greatly improve data transmission efficiency, and implement an instant snapshot of the entire vehicle or a single system of the vehicle.

The control device may be included inside the vehicle, or may be an external device connected to the vehicle. For example, the control device may include a multi-domain controller (MDC), a cockpit domain controller (CDC), or an electronic control unit (ECU) inside the vehicle, or may include a terminal or a server connected to the VIU, for example, a smart mobile phone, a television, a tablet computer, a band, a head-mounted display (HMD), an augmented reality (AR) device, a mixed reality (MR) device, a cellular phone, a smartphone, a personal digital assistant (PDA), a tablet computer, a vehicle-mounted terminal, a laptop computer, or a personal computer (PC).

The VIUs in the vehicle may be deployed based on an actual requirement. The vehicle may be divided into one or more domains based on a quantity of VIUs, and one VIU corresponds to one domain. Each VIU is responsible for controlling access of a device in a corresponding domain, collecting sensor data, or monitoring an execution component in a domain, and monitoring a status of a chip of the VIU, such as a core voltage or a core temperature.

For example, for ease of understanding, some possible vehicle structures provided in this application are used as examples for description.

Figure 3A:
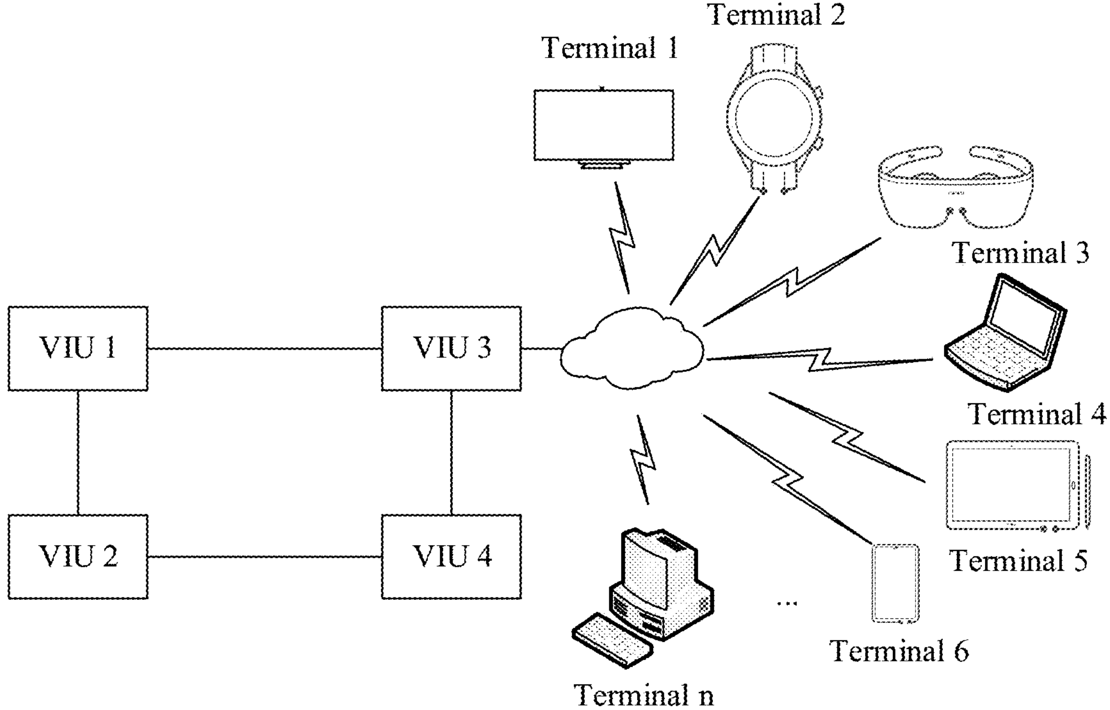
FIG. 3A is a schematic structural diagram of another data transmission system according to this application.

For example, referring to FIG. 3A, a VIU 1, a VIU 2, a VIU 3, and a VIU 4 may form a multicast group, and a network structure corresponding to the multicast group may be a ring structure. Various terminals (for example, a terminal 1 to a terminal n shown in FIG. 3A) may access the multicast group through a wireless network. For example, the terminal may access a router, a switch, or the like through the wireless network, and the router or the switch may access the multicast group through a wired network. Specifically, for example, a wireless router may provide a wireless access manner such as Wi-Fi, 4G, or 5G, and construct a wireless communication channel between a VIU and the outside. For example, a handheld wireless terminal such as a PC, a tablet computer, or a mobile phone may access the wireless network provided by the router, to access the multicast group in which the VIU in the vehicle is located.

Usually, a load balance switch (LSW) is disposed in the VIU, and the VIU may perform communication by using the LSW, for example, receive an instruction or data, or send an instruction or data.

Figure 3B:
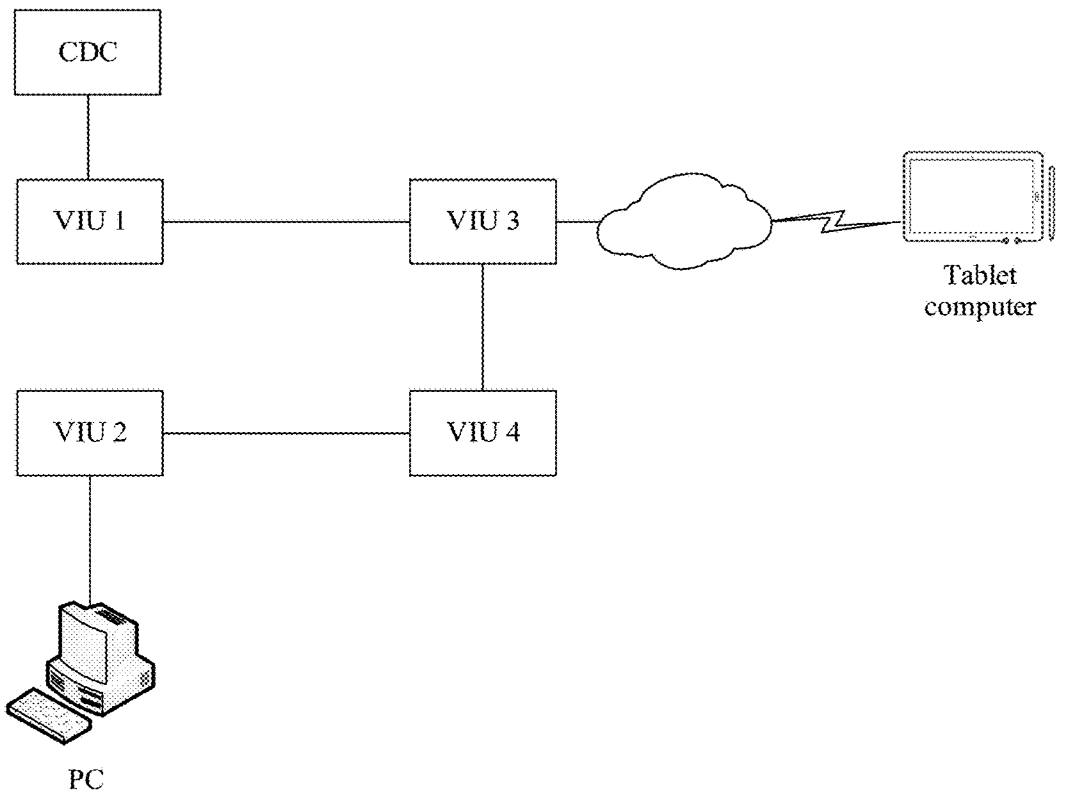
FIG. 3B is a schematic structural diagram of another data transmission system according to this application.

For another example, referring to FIG. 3B, a VIU 1, a VIU 2, a VIU 3, and a VIU 4 may form a multicast group, and a network structure corresponding to the multicast group may be a linear ring structure. A CDC is an apparatus inside the vehicle, and may be directly connected to the VIU 1 through the Ethernet. Herein, the CDC may alternatively be directly connected to the VIU 2, the VIU 3, or the VIU 4 through the Ethernet.

In addition, a connection may be established between a PC and the VIU through the Ethernet, so the PC can access the multicast group. A connection may be established between a table and the VIU in a manner such as Wi-Fi or Bluetooth, so the table can access the multicast group. The CDC, the PC, and the tablet computer may receive, by monitoring a port corresponding to the multicast group, a multicast packet sent by the VIU 1, the VIU 2, the VIU 3, or the VIU 4, and extract, based on the received multicast packet, information monitored by the VIU, or send a control instruction or data to the VIU 1, the VIU 2, the VIU 3, or the VIU 4 by using the multicast group.

Figure 4:
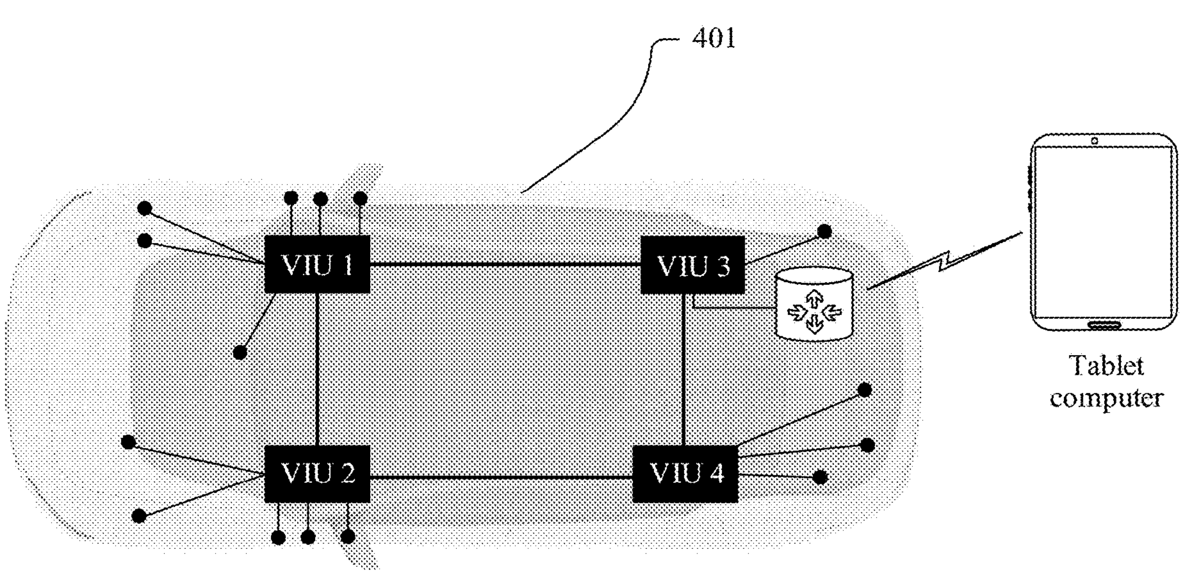
FIG. 4 is a schematic structural diagram of another data transmission system according to this application.

For another example, referring to FIG. 4, a specific vehicle 401 is used as an example. Four VIUs, that is, a VIU 1, a VIU 2, a VIU 3, and a VIU 4, are disposed inside the vehicle. Each VIU may monitor a status of a sensor connected to the VIU, a status of an I/O interface inside the VIU, a status of the VIU, or the like, generate a multicast packet based on the monitored information, and transmit the multicast packet to a multicast group. After accessing the multicast group, a tablet computer may monitor a port corresponding to the multicast group, to obtain the information monitored by the VIU.

The foregoing describes the vehicle provided in this application. The following describes, based on the vehicles provided in FIG. 1 to FIG. 4, a data transmission method provided in this application.

Figure 5:
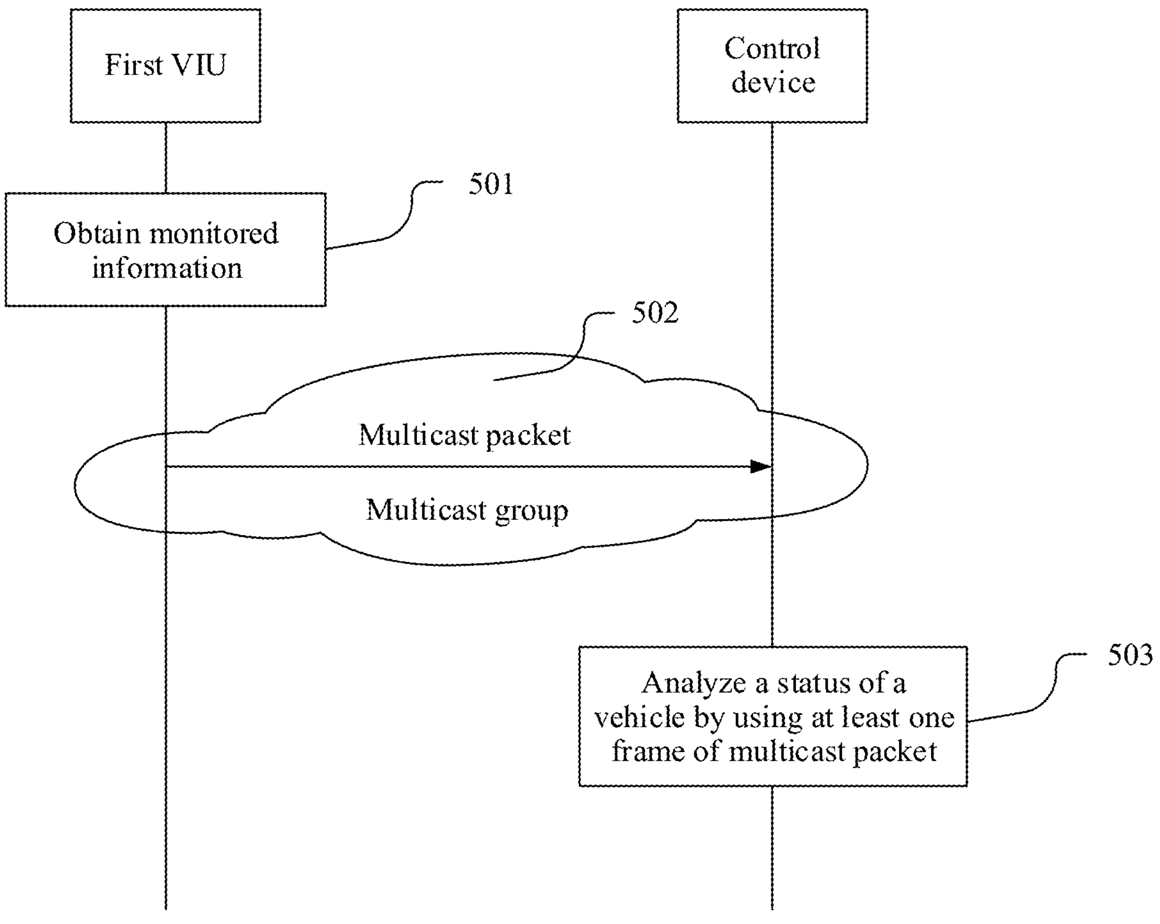
FIG. 5 is a schematic flowchart of a data transmission method according to this application.

FIG. 5 is a schematic flowchart of a data transmission method according to this application. Details are as follows:

501: A first VIU obtains monitored information.

The data transmission method provided in this application may be applied to a vehicle. The vehicle may include at least one VIU, and the first VIU may be any one of the at least one VIU.

The information monitored by the first VIU may include status information of the first VIU, information about an apparatus connected to the first VIU, information about an apparatus included in the first VIU, or the like.

Specifically, the information monitored by the first VIU includes one or more of the following: the status information of the first VIU, information about an I/O interface of the first VIU, an original sampling value of an ADC of the first VIU, information collected by a sensor monitored by the first VIU, input information of another controller or the first VIU, or the like.

For example, the status information of the first VIU may include a running status, a core voltage, a chip core temperature, and the like of the first VIU. The information about the I/O interface may include status information about an I/O channel disposed in the first VIU, for example, information indicating whether a value is 1, and control or monitoring information of a switch chip, a power chip, and the like of the first VIU. The information collected by the sensor may include information collected by a sensor in the first VIU or a sensor connected to the first VIU. The sensor is, for example, a sensor such as an RGB sensor (or referred to as a camera), radar, or a laser rangefinder. Correspondingly, the information collected by the sensor may include information such as an image, an electromagnetic echo point cloud, or a laser point cloud.

502: A control device receives, by monitoring a multicast group, a multicast packet transmitted by the first VIU to the multicast group.

After obtaining the monitored information, the first VIU encapsulates data by using a preset protocol to obtain one or more frames of multicast packets. Then, the first VIU transmits the one or more frames of multicast packets to the multicast group. After obtaining an address of the multicast group, the control device receives, by monitoring a port corresponding to the multicast group, the one or more frames of multicast packets transmitted by the VIU in the multicast group.

The following describes step 502 in detail.

After obtaining the monitored information, the first VIU first encapsulates the data by using the preset protocol to obtain the one or more frames of multicast packets. The preset threshold may include but is not limited to a transmission protocol such as a User Datagram Protocol (UDP), a Transmission Control Protocol (TCP), or an automotive real-time data protocol (ARTDP).

For example, as shown in Table 1, the multicast packet may include a plurality of types of information monitored by the first VIU.

Usually, if the information collected by the first VIU does not exceed a specific amount, the information collected by the first VIU may be encapsulated in one frame of packet, so that the control device can quickly obtain the information collected by the first VIU.

The multicast group may correspond to one or more ports. When a plurality of VIUs are disposed inside the vehicle, the VIUs may use different ports to transmit multicast packets. Certainly, the VIUs may alternatively use a same port to transmit multicast packets. For example, the first VIU may use a port 4000 to transmit a multicast packet, and the control device may monitor the port 4000 corresponding to the multicast group, to receive the multicast packet transmitted by the first VIU. Then, the control device may parse the multicast packet based on a pre-agreed format.

TABLE 1

| Information identifier area | System information area | I/O status information area | ADC sampling information area | PWM and control output area | Switch chip information area | Power management information area | Another function information area | Intermediate variable monitoring area |
|---|---|---|---|---|---|---|---|---|

The information identifier area may include information such as a data type of the multicast packet, the address of the multicast group, a multicast port, and an identifier or an address of the first VIU.

The system information area may include the status information of the first VIU, for example, information such as a running status, a core voltage, or a chip core temperature.

The I/O status information area may include status information of an I/O interface inside the first VIU or connected to the first VUI, for example, an on/off status of an I/O interface.

The ADC sampling information area may include an original sampling value of the ADC at a moment or in a period of time.

The pulse-width modulation (PWM) and control output area may include a modulation mode for the information collected by the first VIU, control information for another apparatus, or the like.

The switch chip information area may include status information, input/output information, or the like of a switch chip. For example, the switch chip information area may include a core temperature of the switch chip (for example, an LSW), a core voltage of the switch chip, output information of the switch chip, or the like.

The power management information area may include information such as a usage status of the power chip or a battery level, for example, may include information such as a running status, a core voltage, and a chip core temperature of the power chip, or a margin, an input battery level, or an output battery level of a power supply.

The another function information area may include status information of or information collected by another apparatus connected to the first VIU, for example, status information of or image information collected by an RGB sensor connected to the first VIU.

The intermediate variable monitoring area may include an intermediate value for a status change of the first VIU in a period of time, an intermediate value for a status change of an apparatus included in the first VIU in a period of time, an intermediate value for a status change of an apparatus connected to the first VIU in a period of time, or the like. For example, if the first VIU is connected to an accelerator pedal, the intermediate variable may include a change value of an opening change of the accelerator pedal in a period of time.

In a possible implementation, if the vehicle includes a plurality of VIUs, the plurality of VIUs may perform time synchronization. For example, each VIU may include an LSW. The VIUs may communicate with each other by using the LSW, perform synchronization by using a preset time synchronization mechanism, and send multicast packets on a time axis obtained after the time synchronization. The VIUs may send the multicast packets at a same moment.

For example, if an Ethernet connection is established among the plurality of VIUs, the plurality of VIUs may perform time synchronization by using an Ethernet time synchronization mechanism, and then send the multicast packets on a time axis obtained after the time synchronization by using time synchronization mechanism. The VIUs may send the multicast packets at a same moment, to quickly complete an instant snapshot of the vehicle, so that a multicast device can simultaneously obtain the multicast packets sent by the plurality of VIUs in the vehicle, accurately and quickly obtain the snapshot of the entire vehicle, and perform subsequent analysis, control, or the like on the vehicle.

In a possible implementation, the VIU may periodically send a multicast packet, so that the control device can periodically receive a multicast file sent by the VIU, and the control device can monitor a status of the vehicle in real time, adjust control over the vehicle, or the like.

In a possible implementation, before step 502, the method may further include: The control device joins the multicast group. Specifically, the control device may send a join request to the VIU in the vehicle to request to join the multicast group. After the VIU receives the join request, if the VIU allows the control device to join the multicast group, the VIU may send a multicast address in response to the join request, so that the control device joins the multicast group based on the multicast address, monitors a port corresponding to the multicast group, and receives the multicast packet transmitted in the multicast group. Further, the control device may analyze the status of the vehicle, control the vehicle, or the like.

503: The control device analyzes the status of the vehicle by using at least one frame of multicast packet.

After receiving the at least one frame of multicast packet sent by the at least one VIU, the control device may analyze the status of the vehicle based on the at least one frame of multicast packet.

For example, if the multicast packet includes status information of the VIU, the control device may analyze a status change of the VIU based on the multicast packet received in a period of time. For another example, if the multicast packet includes an opening of a brake pedal of the vehicle, the control device may analyze a status of a brake system of the vehicle based on the multicast packet received in a period of time.

Therefore, in the method provided in this application, a communication connection may be established for one or more VIUs in the vehicle and a multicast group may be established to transmit a multicast packet in the multicast group, so a snapshot of the vehicle is transmitted. And a snapshot of the vehicle can be transmitted quickly through a high-speed-high-efficiency transmission in a communications network such as the Ethernet or a wireless network. The control device can quickly receive, by monitoring the multicast group, the multicast packet sent by the VIU, to analyze the status of the vehicle by using received one or more frames of multicast packets. This improves efficiency of receiving, by the control device, the information monitored by the VIU. In addition, costs of constructing a control and monitoring system are lowered, all data can be collected and processed without special hardware, and wired and wireless connections can be implemented through flexible deployment. This is applicable to different application scenarios in which the entire vehicle or some functional units need to be controlled and monitored.

It may be understood that, according to the data transmission method applied to the vehicle provided in this application, non-logical transient control over the entire vehicle or a single VIU of the vehicle can be implemented at a same moment, that is, the vehicle is controlled without depending on fixed control logic. In addition, compared with a monitoring tool using a CAN bus, the control device provided in this application can be disposed in the vehicle or connected to the vehicle more efficiently, simply, and at a lower cost. Moreover, in this embodiment of this application, development efficiency of an electrical/electronic architecture of the entire vehicle is greatly improved, a hardware monitoring and self-check method is improved, a case in which only some output/input points can be monitored at a same moment in the conventional vehicle field is changed, and an application scenario of the electrical/electronic architecture of the entire vehicle is expanded.

In a possible implementation, the control device may generate an analysis image based on information included in the plurality of frames of received multicast packets, and display the analysis image through a display device, where the analysis image may include a change of the status of the vehicle with time. For example, the control device may generate a curve indicating that the opening of the brake pedal of the vehicle changes with time, and display the curve on the display screen. For another example, the control device may generate a curve indicating that a core voltage or a chip core temperature of the first VIU changes with time, and display the curve. For still another example, the control device may generate a square wave pattern indicating that a status of the I/O interface of the first VIU changes with time, and display the square wave pattern.

Therefore, in this implementation of this application, if the multicast packet carries an intermediate variable of a change of the status of the vehicle, the control device may generate an image indicating that the status of the vehicle changes with time, and display the image, to intuitively represent the change of the status of the vehicle, so that a user can learn of the status of the vehicle in real time based on the image, or the control device can more accurately control the vehicle based on the change of the status of the vehicle.

In a possible implementation, the method provided in this application may further include: The control device sends a control instruction to the at least one VIU in the multicast group, where the control instruction may be used to control one or more of the I/O interface of the at least one VIU, the sensor, or an executor. The first VIU is used as an example. After receiving the control instruction, the first VIU may respond to the control instruction, and control the one or more of the I/O interface, the sensor, or the executor according to the control instruction. The executor may include an apparatus such as a brake unit, a steering system, or an engine of the vehicle. For example, the control instruction may be merely used to enable or disable an I/O interface, enable or disable a sensor, or indicate a vehicle to brake.

For example, if the multicast packet includes information collected by a sensor connected to the VIU, including information about an ambient environment of the vehicle, such as an image, a laser point cloud, or an electromagnetic echo point cloud, the control device may identify information such as an obstacle, for example, a vehicle, a pedestrian, or a traffic light, in the ambient environment of the vehicle based on the information collected by the sensor, to plan a travel path for the vehicle based on the identified obstacle in the ambient environment of the vehicle, so that the vehicle can travel more safely and stably. This implements autonomous driving of the vehicle and improves user experience.

For another example, in a scenario, if the control device joins the multicast group through a wireless network, the control device may remotely control the vehicle, for example, remotely control the vehicle to close a window, to close a door, or to fold a rearview mirror, so that the user can remotely control the vehicle. Therefore, user experience is improved.

Therefore, in this implementation of this application, the control device may control the vehicle by using the received multicast packet, for example, plan the travel path or remotely control the vehicle, so that the vehicle can travel more safely and stably. Therefore, user experience is improved.

The foregoing describes in detail the procedure of the data transmission method provided in this application. The following describes, in more detail by using a more specific application scenario as an example, the data transmission method provided in this application.

Figure 6:
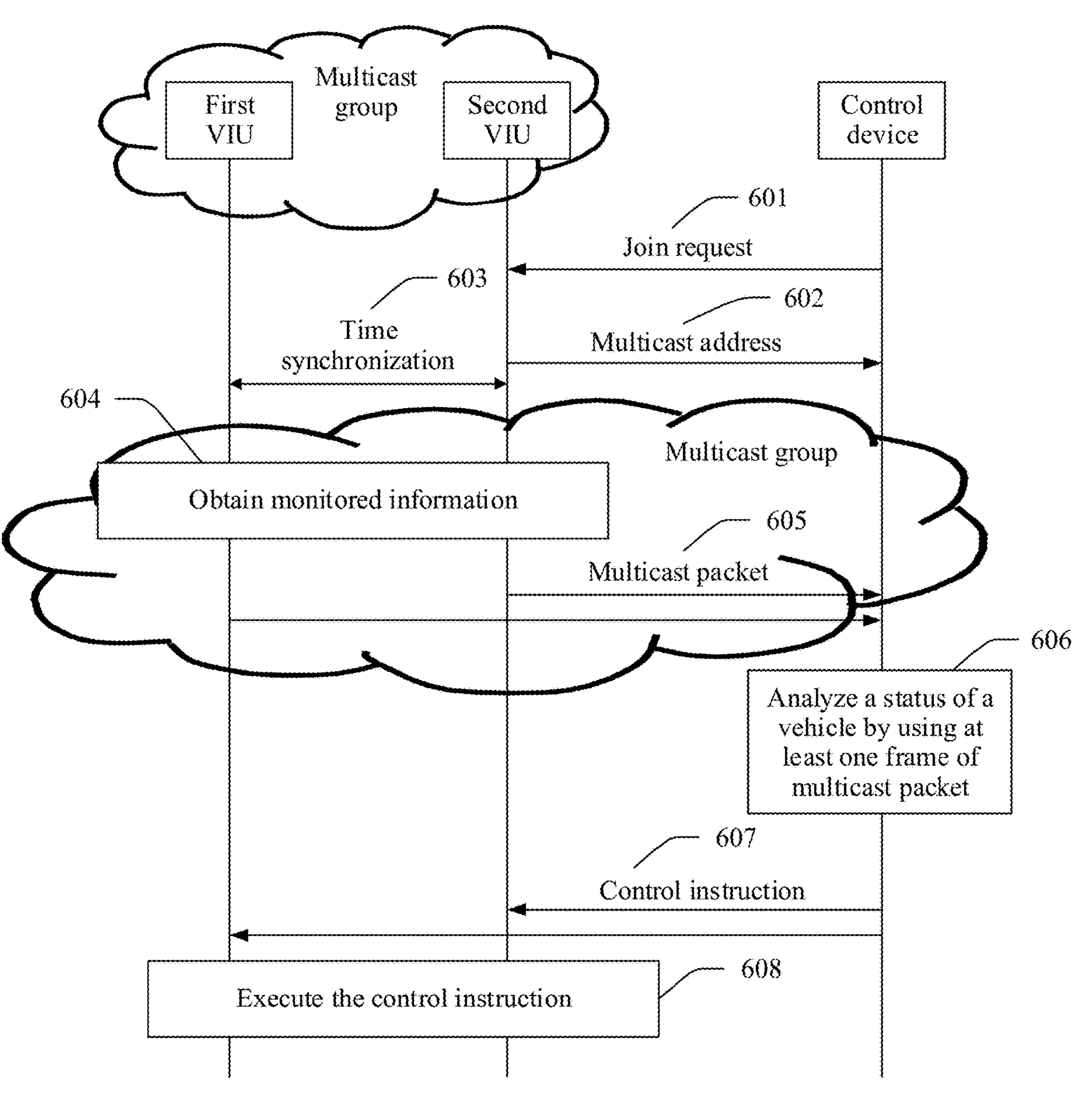
FIG. 6 is a schematic flowchart of a data transmission method according to this application.

FIG. 6 is a schematic flowchart of a data transmission method according to this application. Details are as follows:

601: A control device sends a join request to a second VIU.

A vehicle may include a plurality of VIUs. A communication connection is established among the plurality of VIUs, such as an Ethernet connection or a wireless connection, and the plurality of VIUs access a same multicast group.

The control device may be a terminal, a PC, a server, or a control module such as a CDC or an MDC inside the vehicle. The control device may send the join request to a VIU, for example, the second VIU, to request to join the multicast group. The join request may carry an identifier of the control device, an indication for joining the multicast group, and the like.

602: The second VIU replies with a multicast address.

After receiving the join request, the second VIU determines whether the control device is allowed to join the multicast group, and if the control device is allowed to join the multicast group, replies with the multicast address.

Specifically, the second VIU may determine, in a plurality of manners, whether the control device is allowed to join the multicast group.

For example, in Manner 1, if the control device is the control module inside the vehicle, for example, the CDC or the MDC, the second VIU may determine that the control device is allowed to join the multicast group.

For another example, in Manner 2, if the control device is an external device, for example, a device such as a tablet computer, a PC, or a mobile terminal, the second VIU may query, from a preset list, whether the identifier of the control device is in a list allowed to access the multicast group. If the identifier of the control device is in the list allowed to access the multicast group, the second VIU replies to the control device with the multicast address.

For still another example, in Manner 3, the second VIU may directly display, through a display disposed in the vehicle, information indicating that the control device requests to access the multicast group, and a user determines whether the control device is allowed to join the multicast group. If the user determines that the control device is allowed to join the multicast group, the second VIU may send the multicast address to the control device. In this manner, the user may determine whether the control device is allowed to join the multicast group, and therefore vehicle security and user experience are improved.

Optionally, after determining that the control device is allowed to access the multicast group, the second VIU may add the identifier of the control device to a local list, where the list stores the control device that accesses the multicast group. In this way, the second VIU can subsequently determine, based on the table, specific devices that access the multicast group, or when the control device requests to join the multicast group again, the second VIU allows the control device to access the multicast group.

Certainly, if the second VIU determines that the control device is not allowed to join the multicast group, the second VIU does not reply to the control device with a message, or replies to the control device with a reject message or the like, to reject access of the control device to the multicast group. For example, if the identifier of the control device is not in the list allowed to access the multicast group, or the user determines to reject access of the control device to the multicast group, the second VIU may not reply to the control device with a message, or reply to the control device with a reject message or the like, to reject access of the control device to the multicast group.

After receiving the multicast address, the control device may join the multicast group according to a corresponding protocol based on the multicast address, and monitor a port corresponding to the multicast group. For example, if the multicast group is established based on the Ethernet, the control device may access the multicast group according to a corresponding Ethernet communications protocol based on the multicast address, and can subsequently parse received data according to the communications protocol.

For example, the control device may be a terminal, for example, a terminal based on an Android system such as a tablet computer or a mobile terminal, and a customized VIU health monitoring application (APP) may run on the Android terminal. A specified multicast group is subscribed to in the app, so that a multicast packet sent by each VIU can be obtained and can be displayed in a rich data visualization view. This facilitates tracking of a running status and key debugging information of the VIU and improving the feasibility of the maintenance and testing of the VIU.

603. A first VIU and the second VIU perform time synchronization.

To avoid a problem that data is not transmitted at a same moment due to time asynchronization between VIUs in the vehicle, before transmitting the data, the VIUs in the vehicle may perform or periodically perform time synchronization.

Specifically, the first VIU and the second VIU may send a time synchronization message to each other, to perform time synchronization. For example, in a period of time, the first VIU may periodically send a time synchronization message to the second VIU, where the synchronization message may carry a clock of the first VIU, and the second VIU may determine a link transmission latency based on the clock carried in the periodic time synchronization message, to synchronize the clock with the first VIU.

For example, the first VIU may perform time synchronization by using a Generalized Precision Time Protocol (gPTP) time synchronization mechanism, so that each VIU sends data on a time axis obtained after the synchronization.

Therefore, in this implementation of this application, the VIUs may perform time synchronization, for example, perform time synchronization according to the gPTP time synchronization mechanism, to send the data based on the time axis obtained after the synchronization, so as to implement synchronous sending of data by the VIUs. This avoids a case in which system snapshot periods are misaligned and meaningless due to asynchronous sending of data.

604: The first VIU and the second VIU obtain monitored information.

For the step in which the first VIU and the second VIU obtain the monitored information, refer to the related descriptions in step 501. Details are not described herein again.

605: The control device receives, by monitoring the multicast group, a multicast packet transmitted by each of the first VIU and the second VIU in the multicast group.

The first VIU and the second VIU perform the time synchronization, and the first VIU and the second VIU may send the respective monitored information on the time axis obtained after the time synchronization.

After accessing the multicast group, or after subscribing to the multicast group, the control device monitors each port corresponding to the multicast group, to receive the multicast packets respectively transmitted by the first VIU and the second VIU in the multicast group.

For example, after obtaining the monitored information, the VIU may load the monitored information into one frame of packet, and then periodically send the monitored information in a preset format to a specified port by using an LSW based on a clock beat of a current system. Then, the VIU uses a layer 2 switching protocol of the switch to quickly copy and send the packet, and forwards the packet within a forwarding latency (for example, 5 μs to 10 μs) of a switch node. This implements quick sending of the multicast packet. The control device may accurately record global status information of the vehicle based on the current clock beat, and display a status of the vehicle in a manner such as analyzing the status of the vehicle by using a received multicast packet, or drawing a curve or a dynamic graph. This meets data analysis requirements in different scenarios, for example, a video application scenario, a machine learning application scenario, and an application scenario for target tracking in a radar system.

The following separately describes, by using examples, the steps performed on the VIU side and the control device side.

First, examples of the steps performed on the VIU side are described below.

Each VIU may monitor statuses of or data collected by a plurality of apparatuses such as a plurality of sensors or a plurality of executors of the vehicle. When collecting a plurality of types of data, the VIU may load the plurality of types of data into a same frame of multicast packet, to improve transmission efficiency.

For example, the VIU may encapsulate and transmit the packet by using an ARTDP protocol. A length of information included in each frame of multicast packet may be specifically shown in Table 2.

TABLE 2

| ARTDP protocol header | MCU information | Network information | Auxiliary chip status information | Others | Verification |
|---|---|---|---|---|---|
| 20 bytes | N bytes | M bytes | K bytes | X bytes | Y bytes |

The ARTDP protocol header is used to distinguish between location information of a VIU source node and location information of another necessary node.

The MCU information may include an actual control value, status information, or the like of an MCU chip.

The network information may include a communication status, a connection manner, transmission quantity statistics, network detection information, or the like of the VIU for a communication connection.

The auxiliary chip status information may include status information, such as a current, a temperature, a voltage, or input/output information, of a chip such as a power management chip, a chip drive chip, an extension chip, or an MCU that can collect information.

Usually, 20+N+M+K+X+Y<1472 (bytes), to ensure that the information collected by the VIU is sent in a same frame, prevent the information collected by the VIU from being split into a plurality of frames, and implement efficient transmission of the multicast packet.

Then, the VIU periodically sends the multicast packet in the multicast group, for example, sends the multicast packet every 1 second.

Therefore, in this implementation of this application, the multicast group can be used to efficiently and accurately transmit the multicast packet and implement an instant snapshot of the vehicle; and there is no need to establish a plurality of links and connections to complete sending of the multicast packet by using a queue. This avoids a case that an instant snapshot of an entire system cannot be completed through data sending.

Figure 7:
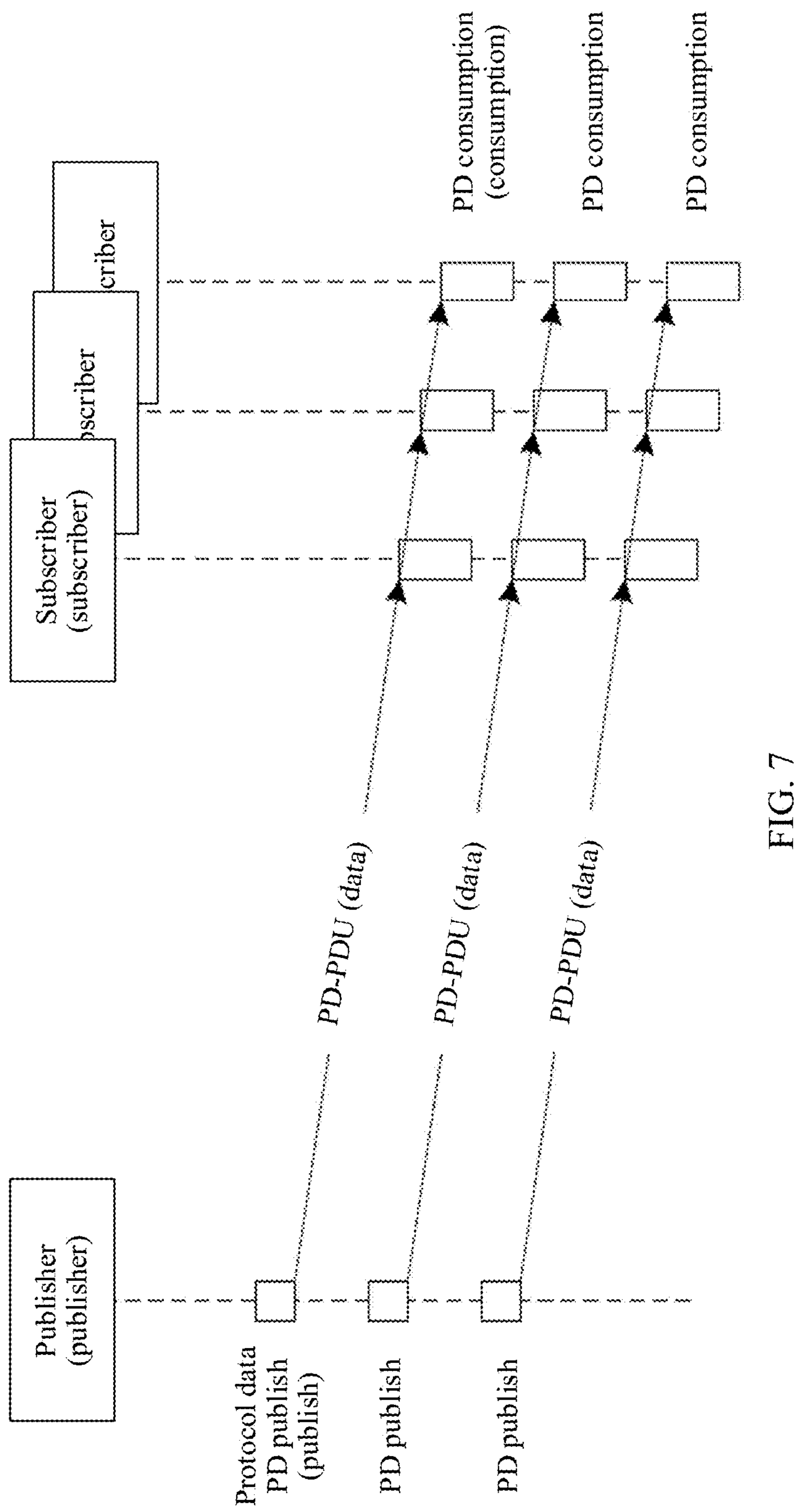
FIG. 7 is a schematic diagram of a data transmission manner according to this application.

It may be understood that the VIU is used as a publisher, and the control device is used as a subscriber. As shown in FIG. 7, the publisher may send protocol data (PD) to the multicast group in a manner defined in a protocol data unit (PDU). The subscriber may monitor each port corresponding to the multicast group and obtain the PD published by each VIU.

Then, examples of the steps performed on the control device side are described below.

After accessing the multicast group, or after subscribing to the multicast group, the control device monitors each port corresponding to the multicast group, to receive the multicast packet sent by the VIU.

After receiving the multicast packet, the control device may parse the multicast packet according to a preset protocol, to obtain information monitored by each VIU.

Usually, the VIU may periodically send the multicast packet, and correspondingly, the control device may also periodically receive the multicast packet sent by the VIU.

Optionally, when the control device does not receive, in N consecutive periods, a multicast packet sent by a VIU, the control device may check whether a connection to the VIU is interrupted, or display prompt information, to prompt for a failure in the communication connection to the VIU, a communication fault, a VIU fault, or the like.

For example, the control device is a terminal with an Android system. A VIU health monitoring app is installed in the terminal. In the app, a VIU communication monitoring processing module is enabled, and a communication check is performed based on a communication period defined in a PDU. After a background service is enabled in the app, a UDP multicast client subscribes to a specified multicast group, monitors a specified local port, and obtains a required UDP multicast packet; and a customized UDP packet decoder parses a PDU ID. When obtaining the UDP multicast packet, the background service in the app updates a status of the processing module based on the PDU ID. If the background service in the app does not receive, in a continuous time period that exceeds a specified period (for example, five periods), a multicast packet sent by a VIU, the background service in the app determines that the VIU is offline due to timeout and notifies a foreground activity in the app through a callback interface, for example, displays information that a VIU is offline or faulty. A data bus used to transmit the UDP packet may be customized in the app. After obtaining the UDP multicast packet, the background service in the app packetizes the packet and publishes the packet to the bus. The foreground activity in the app registers with a monitor the bus to obtain the UDP packet. When obtaining the UDP multicast packet, the background service in the app parses data by using the UDP packet decoder and notifies the foreground activity in the app through the callback interface, for example, updates status information of the VIU.

For another example, the control device is a terminal with an Android system. A VIU health monitoring app is installed in the terminal, and a decoder class such as a UDP packet decoder class is compiled in the app. An instance of this class may be obtained by inputting a UDP packet (that is, the multicast packet), to parse the UDP packet.

Usually, VIUs may upload data based on respective local clocks, and a clock difference may exist between a plurality of VIUs. The control device may receive all data by monitoring specified ports corresponding to the multicast group, and perform beat synchronization based on a packet frame count in a protocol field, or may parse in the same period, according to a gPTP time synchronization mechanism, the received data, to obtain information monitored by the VIUs in the vehicle at a same moment. This avoids a case in which the data is inaccurate, invalid, or the like due to period misalignment.

606: The control device analyzes the status of the vehicle by using at least one frame of multicast packet.

After receiving the at least one frame of multicast packet, the control device may parse the at least one frame of multicast packet to analyze the status of the vehicle by using a parsing result, and further give a prompt, control the vehicle, or the like based on the status of the vehicle.

For example, the multicast packet includes an original sampling value of an ADC. After receiving the multicast packet, the control device may calculate an actual value of each channel of the ADC by using a preset formula. For example, the preset formula may be: Sampled value x Voltage division coefficient=Actual ADC value. Therefore, the control device can analyze a change status of the actual value of each channel of the ADC of the vehicle by using the multicast packet that is received through monitoring the multicast group, to learn of a conversion status of the ADC of the vehicle.

Optionally, after analyzing the status of the vehicle by using the at least one frame of multicast packet, the control device may draw a curve based on an analysis result to obtain an analysis image. Specifically, the control device may draw the curve based on a time axis and status information of an I/O interface, the ADC, or the like, and display a dynamic curve. This facilitates observation by a user.

When drawing the curve, the control device may reference intermediate values of some hardware variables monitored by the VIU, to more accurately analyze the change status of the vehicle. For example, an initial value, an intermediate value, and a final value of a change of an opening of an accelerator pedal in a period of time may all be included in the multicast packet. The control device obtains the initial value, the intermediate value, and the final value of the change of the opening of the accelerator pedal in the period of time through parsing by using the multicast packet, and draws a curve based on the initial value, the intermediate value, and the final value of the change of the opening of the accelerator pedal in the period of time, to more intuitively reflect a status of the change of the accelerator pedal in the period of time.

Optionally, when the multicast packet carries information, such as a laser point cloud, an electromagnetic echo point cloud, or an image, that is collected by a sensor and that is monitored by the VIU, the control device may output, based on a pre-trained perception model, a pedestrian, a vehicle, a traffic light, or other environment information monitored by the sensor, and the control device may generate an environment image based on information output by the perception model, where the environment image includes the pedestrian, the vehicle, the traffic light, or the other environment information monitored by the sensor, so that the user can observe an environment around the vehicle by using the environment image. Therefore, user experience is improved.

Optionally, after receiving the multicast packet and obtaining a parsing result, the control device may locally store the parsing result or store the multicast packet based on a time axis, so that a historical status of the vehicle can be subsequently analyzed based on historical data. Therefore, user experience is improved.

For example, the control device is a terminal with an Android system. A VIU health monitoring app is installed in the terminal, data is stored in the app by using an SQLite database, and a viu_log table is established by using a to-be-recorded data item as a column name. Each time receiving a UDP packet, the background service in the app obtains all data of the packet through parsing by using the UDP packet decoder, adds a timestamp to the data, and then writes the data into the viu_log table. The background service in the app checks and deletes, every half an hour, data located in the database one hour earlier than a current time.

Optionally, the control device may further calculate a bandwidth of the vehicle based on a quantity of received multicast packets. The control device may generate a prompt message based on a bandwidth usage status of the vehicle, to prompt for a case in which the bandwidth of the vehicle is sufficient, insufficient, or the like. Alternatively, when bandwidth usage of the vehicle is greater than a bandwidth threshold, the user may be prompted to expand the bandwidth, or the VIU is notified to control an amount of to-be-sent data, to reduce the bandwidth usage and keep the bandwidth sufficient.

For example, a UDP packet decoder and a bandwidth calculator may be disposed in the control device. The UDP packet decoder obtains accumulated received and sent packet counts on each port of an LSW chip of each VIU, and then transmits the data to the bandwidth calculator. In the bandwidth calculator, a first-in-first-out data queue is established for each port to store all packet counts within one second. Each time new data enters a queue, data at the front of the queue is pushed out, and a difference between the new data and the data at the front of the queue is returned. The difference is a received (sent) packet count $P_c$ on the port within 1 second. Downlink (uplink) bandwidth data on the port can be calculated by using a bandwidth calculation formula. The bandwidth calculation formula may be: bandwidth=$P_c$*R+Offset (bytes/s), where bandwidth represents a bandwidth, R is a size coefficient of the multicast packet and is a preset value, and Offset is a constant. When the bandwidth usage reaches 95%, the control device may generate prompt information to prompt the user to expand the bandwidth, or send a control instruction to the VIU to control an amount of data transmitted by each VIU, to reduce the bandwidth usage.

It may be understood that in the data transmission method applied to the vehicle provided in this application, a global system instant snapshot in an Ethernet technology is used to complete a global snapshot of an electronic system in an electrical/electronic (E/E) architecture of the entire vehicle. In addition, the VIUs perform time synchronization, to complete synchronization snapshots of nodes in a same running period. The control device completes information collection for the entire system in a same period by using a point-to-multipoint multicast communication data synchronization distribution mechanism.

607: The control device sends a control instruction to each of the first VIU and the second VIU.

The control device analyzes the status of the vehicle by using the at least one frame of multicast packet, and may send the control instruction to each VIU based on the status of the vehicle, to control each VIU by using the control instruction, and further control the vehicle. Alternatively, the control device may send the control instruction to each VIU based on an operation of the user, to control each VIU by using the control instruction, and further control the vehicle.

Usually, VIUs may correspond to modules in different parts of the vehicle. For example, if a door of a main cockpit of the vehicle is controlled by a VIU 1, the control device may use the control instruction to carry an identifier of the VIU 1, to control open or close of the door of the main cockpit by using the vehicle. Alternatively, if different VIUs transmit data on different ports in the multicast group, the control device may send the control instruction on a port corresponding to a VIU 1, so that the VIU 1 receives the control instruction and executes the control instruction, for example, controls close of a door, close of a window, or the like.

608: The first VIU and the second VIU execute the control instruction.

After receiving the control instruction sent by the control device, the VIU parses and executes the control instruction.

Usually, VIUs may correspond to modules in different parts of the vehicle, and each VIU may receive a message transmitted in the multicast group. When a VIU receives a control instruction that carries an identifier of the VIU, the VIU may determine that a sending target of the control instruction is the VIU. The VIU may parse the control instruction, and execute the control instruction, for example, enable or disable an I/O interface or a sensor connected to the VIU, or control an executor connected to the VIU, for example, control an opening of an accelerator pedal, an opening of a brake pedal, or a turning angle of a steering wheel.

Figure 8:
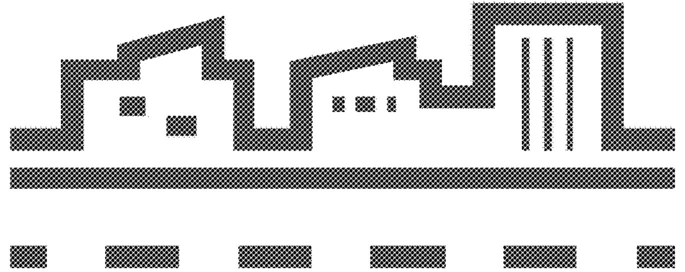
FIG. 8 is a schematic diagram of an application scenario of a data transmission method according to this application.
Figure 8:
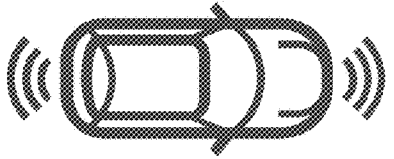

For example, in some autonomous driving scenarios, as shown in FIG. 8, a control device may be a device such as an MCU or a vehicle-mounted terminal of a vehicle. The control device may obtain, by using a multicast packet, data such as a laser point cloud, an electromagnetic echo point cloud, or an image collected by a sensor such as a laser rangefinder, radar, or a camera of the vehicle, and outputs, by using a preset perception model, perception information collected by the sensor. The control device may plan a travel path for the vehicle based on the perception information, and send a control instruction to each VIU based on the travel path, to control, by using the VIU, the vehicle to travel based on the travel path.

Figure 9:
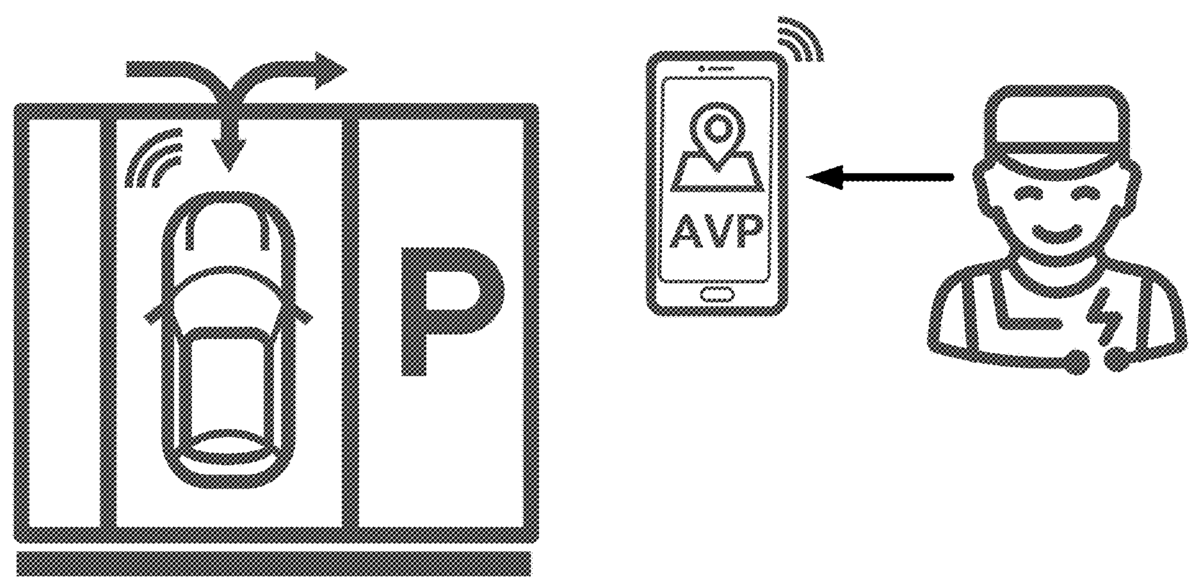
FIG. 9 is a schematic diagram of an application scenario of another data transmission method according to this application.

For another example, in some automated valet parking (AVP) scenarios, as shown in FIG. 9, a control device may be a device such as a tablet computer or a handheld terminal. The control device may access a multicast group through a communications network such as 4G, 5G, or Wi-Fi, and send a control instruction to each VIU of a vehicle, to control a steering system, an accelerator, a brake unit, or the like of the vehicle, so that the vehicle moves into parking space.

Figure 10A:
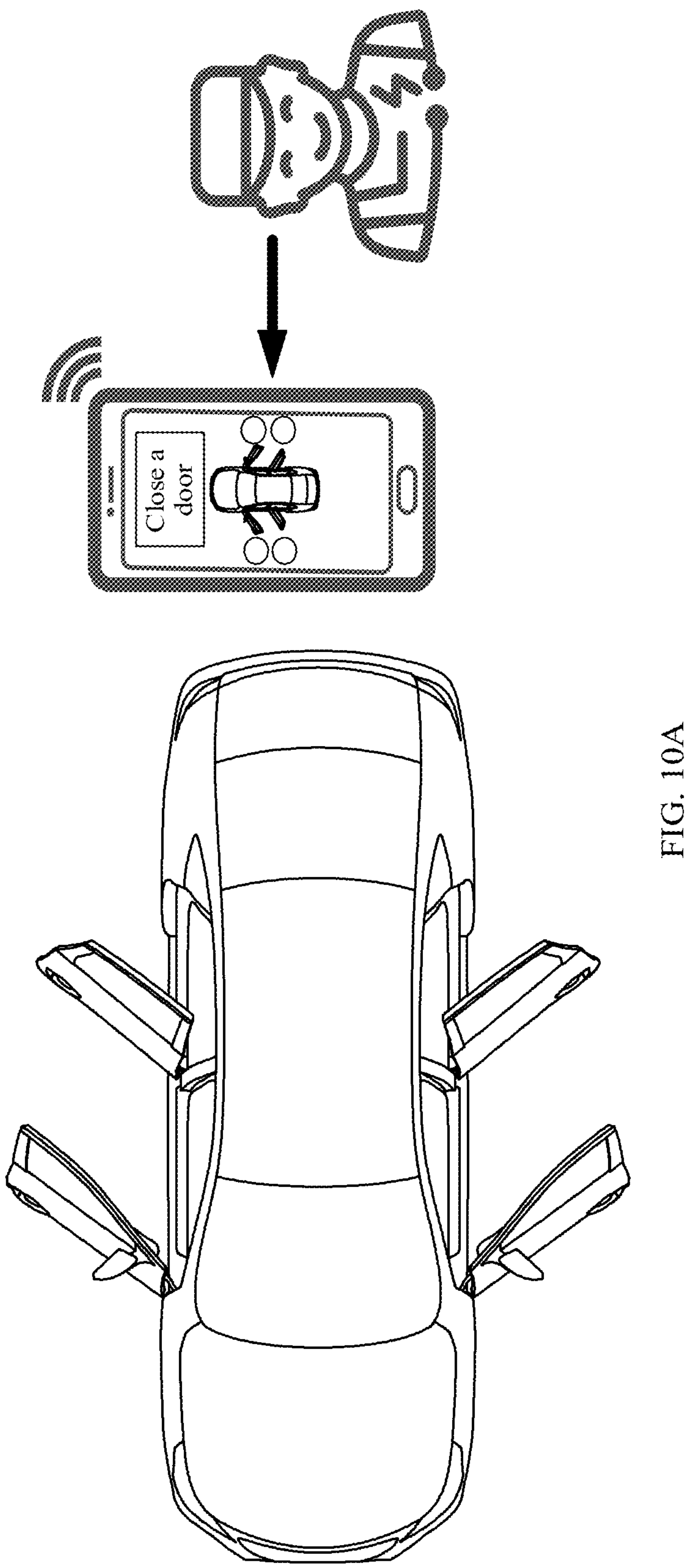
FIG. 10A is a schematic diagram of an application scenario of another data transmission method according to this application.
Figure 10B:
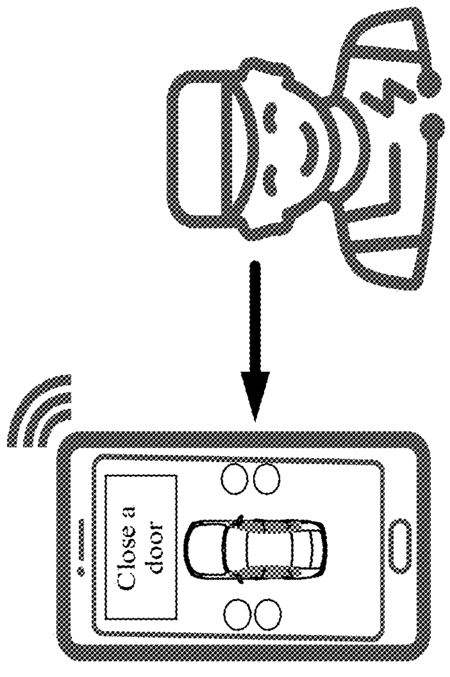
FIG. 10B is a schematic diagram of an application scenario of another data transmission method according to this application.
Figure 10B:
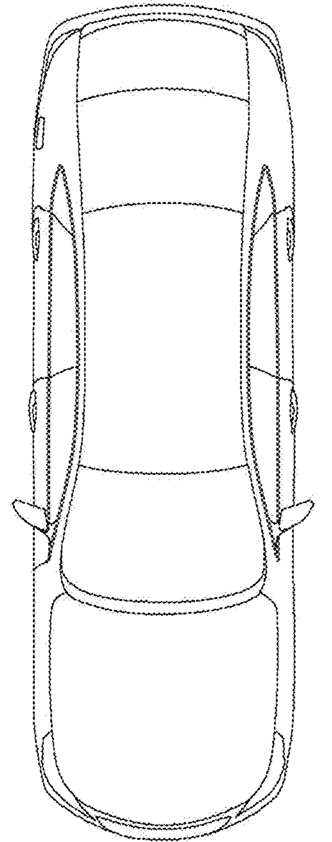

For another example, in some remote control scenarios, a control device may be a device such as a tablet computer or a handheld terminal. The control device may access a multicast group corresponding to a vehicle through a wireless network, and the control device may include a display screen, and may display, on the display screen, a status of the vehicle obtained based on a multicast packet, for example, an on/off status of an I/O interface corresponding to a window, or an on/off status of an I/O interface corresponding to a door. A user may remotely send a control instruction to the multicast group by using the control device, to control an operation such as closing a door, closing a window, or folding a rearview mirror. For example, the control device may access the multicast group through a communications network such as 4G, 5G, or Wi-Fi. As shown in FIG. 10A, if a door of a vehicle is not closed, the door that is not closed may be displayed on the terminal, and a user may select, in a display interface of the terminal, the door that needs to be closed, so that the door of the vehicle is closed. As shown in FIG. 10B, the terminal may send, to a VIU in the multicast group through a communications network such as 4G, 5G, or Wi-Fi, a control instruction for closing a door, so that a corresponding VIU adjusts on/off of an I/O interface corresponding to the door, to remotely control opening/closing of the door.

It may be understood that in the data transmission method applied to the vehicle provided in this application, after accessing the multicast group, the control device obtains the information monitored by the VIU, and may accurately control a single I/O of the VIU, a sensor, or the like, so that the vehicle can be more accurately controlled. In addition, in the scenario in which the control device accesses the multicast group through the wireless communications network, the control device may be used to remotely control the vehicle. This improves vehicle safety and improves user experience. It may be understood that in the vehicle provided in this embodiment of this application, a system monitoring and debugging function of the entire vehicle platform is constructed by using a new electrical/electronic architecture of the entire vehicle and a communications technology (for example, Ethernet communication or wireless communication). A complete control logic diagram can be drawn by using snapshot data, and various algorithms and software control logic in the vehicle can be comprehensively output and monitored. Alternatively, the system monitoring and debugging function may be used as a detection tool to manually or automatically diagnose an input/output point and an internal monitoring point of the entire vehicle device. Alternatively, the system monitoring and debugging function may be used as basic application data and provided for an upper-layer application, and the collected data may be recorded as historical data for analysis.

Therefore, in this implementation of this application, the VIU and the control device may be connected to each other through the wireless or wired communications network, so that a data transmission rate of the VIU is improved, and an instant snapshot of the entire vehicle or a system of the vehicle is efficiently and accurately completed. In addition, the control device may join the multicast group in which the VIU is located, monitor the multicast packet transmitted by the VIU in the multicast group, and parse the information carried in the multicast packet, to analyze the status of the vehicle based on the information carried in the multicast packet.

The foregoing describes in detail the vehicle and the data transmission method provided in this application. The following describes, in detail with reference to the vehicle and the data transmission method, a GUI provided in this application. For ease of understanding, the following describes, by using an example with reference to some display interfaces, the GUI provided in this application.

First, this application provides a graphical user interface, and the GUI is stored in an electronic device.

Then, this application further provides an electronic device. The electronic device includes a display screen, a memory, and one or more processors. The one or more processors are configured to execute one or more computer programs stored in the memory. The display screen is configured to display a graphical user interface stored in the memory.

The following describes a graphical user interface in this application. The graphical user interface includes: displaying a multicast address of a multicast group, where the multicast group includes at least one VIU; and in response to an acknowledgment operation for the multicast address and receiving of at least one frame of multicast packet transmitted by the at least one VIU in the multicast group, displaying information included in the at least one frame of multicast packet.

Figure 11:
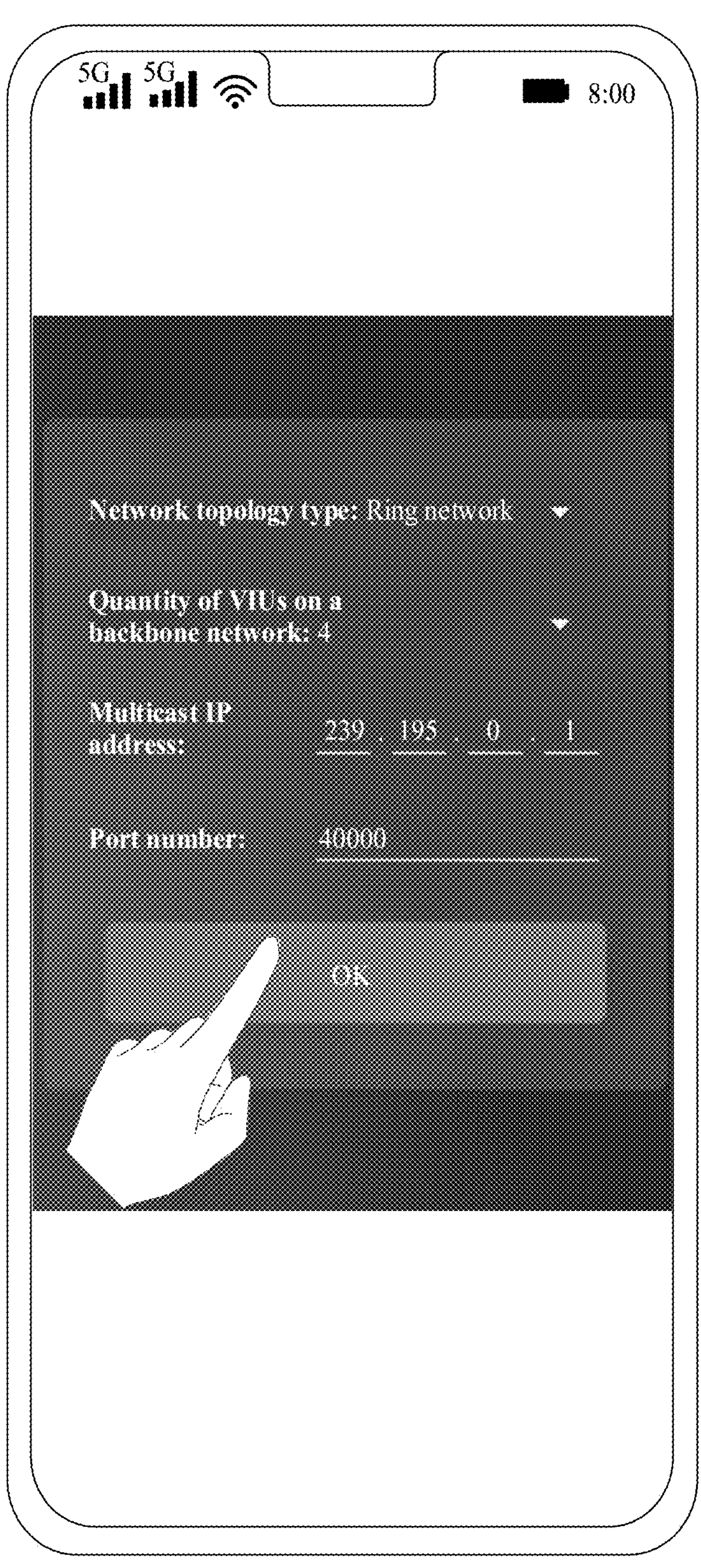
FIG. 11 is a schematic diagram of a display interface of a GUI according to this application.

For example, as shown in FIG. 11, an obtained address, that is, an IP address shown in FIG. 11, of the multicast group may be displayed on the display screen. Optionally, a network topology type (for example, a ring-network structure) of the multicast group, a quantity of VIUs (for example, four VIUs), or a port number (for example, 40000) may be further displayed on the display screen. When a user taps an "OK" button, a join request may be sent to any VIU based on the IP address, to request to join the multicast group.

In a possible implementation, the graphical user interface specifically includes: displaying one or more of status information of the at least one VIU, information about an I/O interface of the at least one VIU, an original sampling value of an ADC of the at least one VIU, or information collected by a sensor monitored by the at least one VIU.

For example, after accessing the multicast group, the terminal may receive, by monitoring a port corresponding to the multicast group, the multicast packet sent by the VIU, parse the multicast packet, and display information included in the multicast packet. For a process of parsing the multicast packet, refer to the related descriptions in FIG. 5 or FIG. 6. Details are not described herein again.

Figure 12:
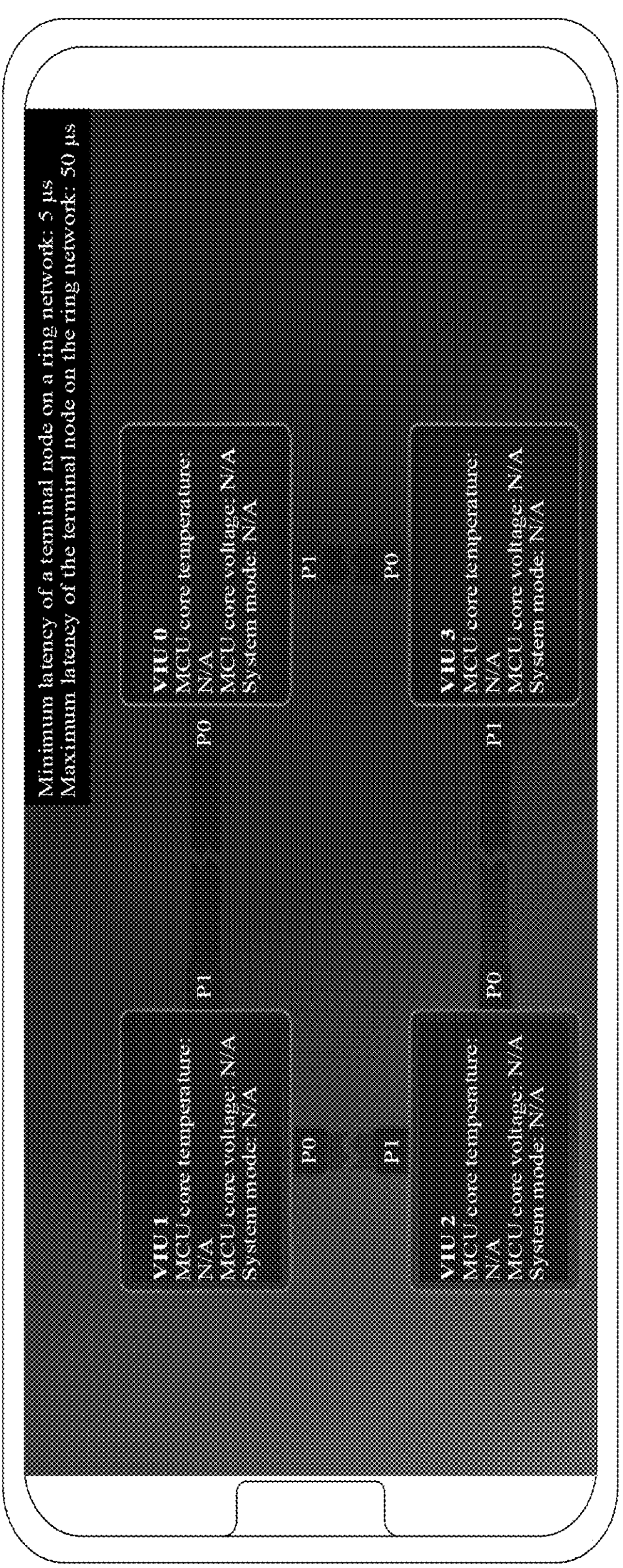
FIG. 12 is a schematic diagram of a display interface of another GUI according to this application.

For example, as shown in FIG. 12, if the multicast packet carries information such as an MCU core temperature of each VIU, an MCU core voltage of each VIU, or a system running state of each VIU, the information such as the MCU core temperature of each VIU, the MCU core voltage of each VIU, or the system running state of each VIU may be displayed on the display screen. In this interface, a foreground activity in an app obtains a VIU communication status and a UDP multicast packet, and obtains information such as a PDU ID, a VIU system status, a communication bandwidth, or a latency through parsing by using a UDP packet decoder. A ring-network topology including four VIUs in the vehicle is displayed in the interface. Certainly, if the VIUs are connected by using another topology, a corresponding topology may also be displayed in the interface. The ring-network topology is merely used as an example for description herein. Each VIU is connected to a port 1 of an adjacent VIU through a port 0 of an LSW. Core data, for example, information such as an MCU core temperature, an MCU core voltage, or a system running status of each VIU, may be displayed in real time on each VIU module. In addition, node latencies in a ring network may be further displayed in the interface, for example, latency values displayed in the upper right corner in FIG. 12. To more intuitively display a status of a connection between VIUs, when two adjacent VIUs normally communicate with each other, a link between the VIUs is connected in the display interface. Real-time data on the link indicates negotiated bandwidth between the VIUs, and an arrow direction indicates a data transmission direction. An arrow color may be used to indicate an uplink bandwidth proportion on a port 0 of an LSW chip of each VIU (for example, green indicates that the bandwidth proportion is less than 40%, yellow indicates that the bandwidth proportion ranges between 40% and 70%, and red indicates that the bandwidth proportion is greater than 70%). When the communication between the VIUs is interrupted, the link connected between VIU blocks is broken and an arrow disappears. When the communication between the VIUs is normal, a VIU block may be tapped to enter a VIU system function monitoring information details page. Otherwise, a dialog box is displayed, indicating that the VIU devices are disconnected.

Usually, a relatively large amount of information is obtained by using the at least one frame of multicast packet. To improve user experience, the information about the vehicle may be classified and displayed, that is, the information obtained by using the at least one frame of multicast packet is classified into a plurality of types. For example, the information obtained by using the multicast packet may be classified based on hardware of the vehicle, and is classified into information such as electric power steering (EPS), bandwidth information of an LSW, a value of each channel of an ADC, an on/off status of an I/O interface, and a status of an electronic brake system (EBS). Certainly, the information obtained by using the multicast packet may alternatively be classified in another classification manner, for example, may be classified based on an information type. Specifically, this may be adjusted based on an actual application scenario. This is not limited herein.

After the information collected by each VIU in the vehicle is obtained by using the at least one frame of multicast packet, in response to a selection operation performed by the user on each piece of classification information, a change status of the information collected by each VIU in the vehicle may be more intuitively displayed by drawing a curve. For example, for ease of understanding, the GUI provided in this application is described below by using a system internal key data monitoring module, a board I/O status monitoring module, a board ADC monitoring module, an LSW chip monitoring module, a brake system monitoring module, a steering system monitoring module, and the like as examples.

Figure 13:
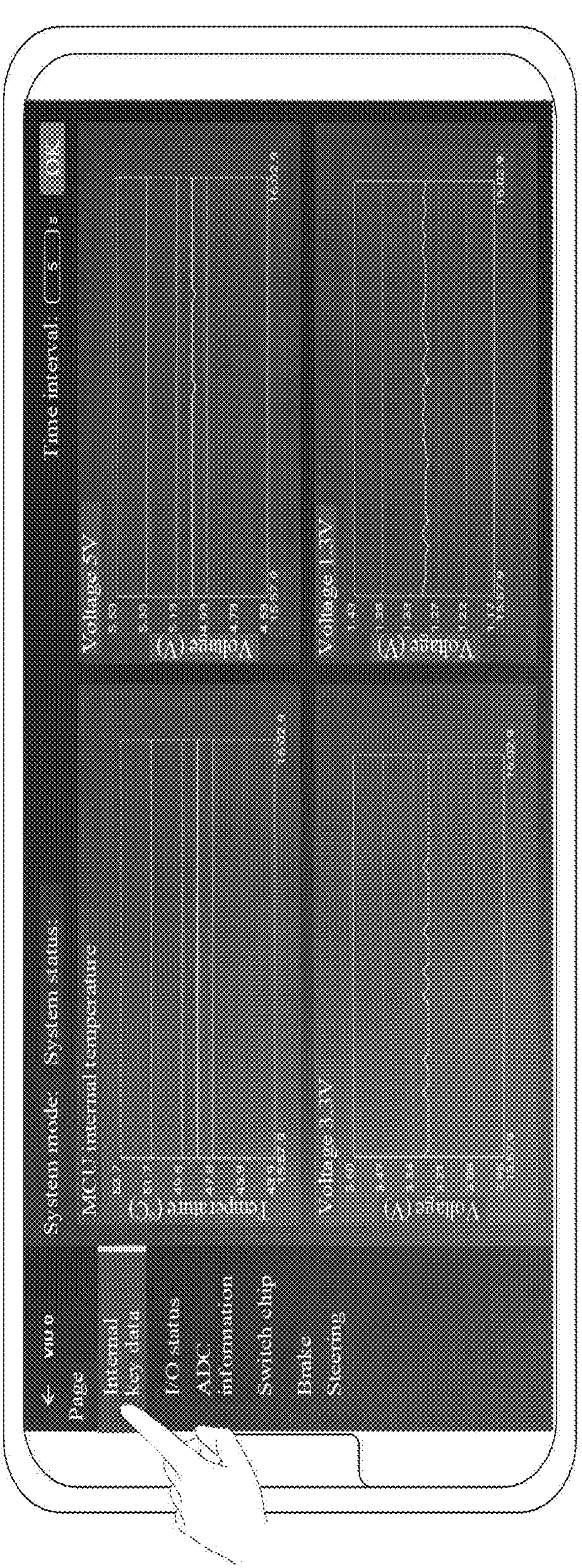
FIG. 13 is a schematic diagram of a display interface of another GUI according to this application.

As shown in FIG. 13, a curve may be drawn for status information of a VIU in a period of time, such as an MCU internal temperature and voltages at different locations, and the curve is displayed on the display screen in response to an operation of selecting status information of the VIU by the user.

Figure 14:
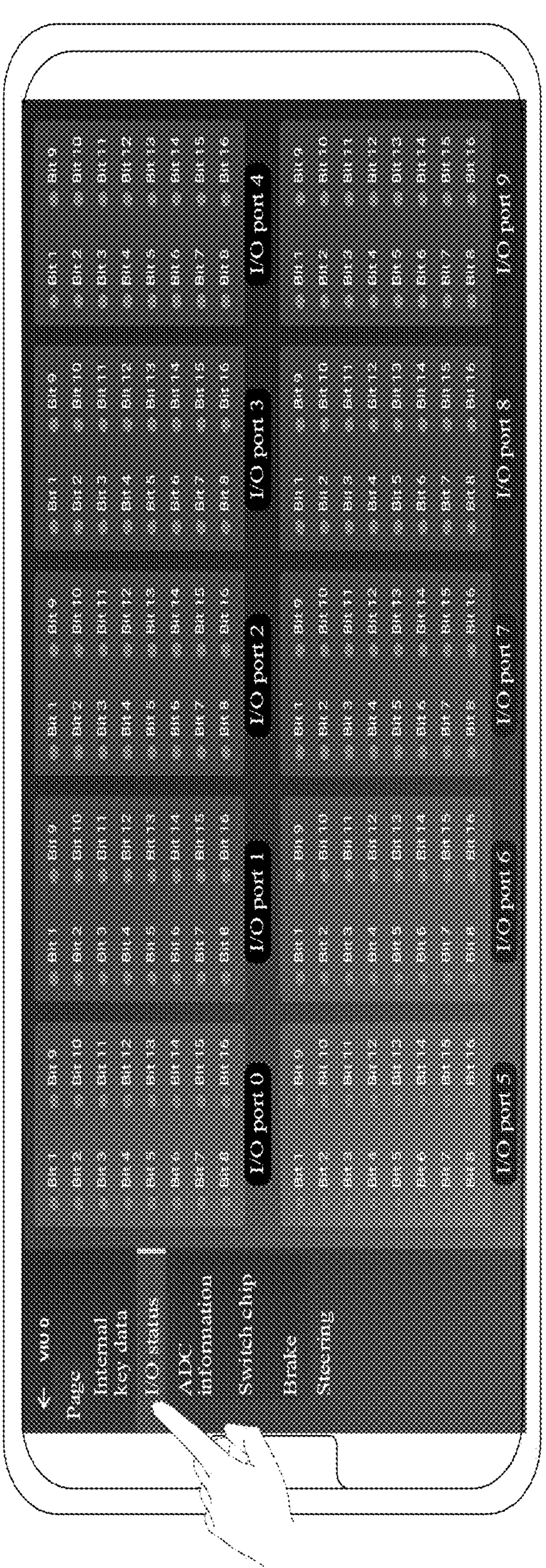
FIG. 14 is a schematic diagram of a display interface of another GUI according to this application.

As shown in FIG. 14, a VIU 0 is used as an example. Current statuses of 10 groups of I/O ports of the VIU 0 may be displayed. Each group of I/O ports includes 16 I/O interfaces, and a status of each I/O interface may be represented by using one bit. For example, 1 indicates a high level, and 0 indicates a low level.

Figure 15:
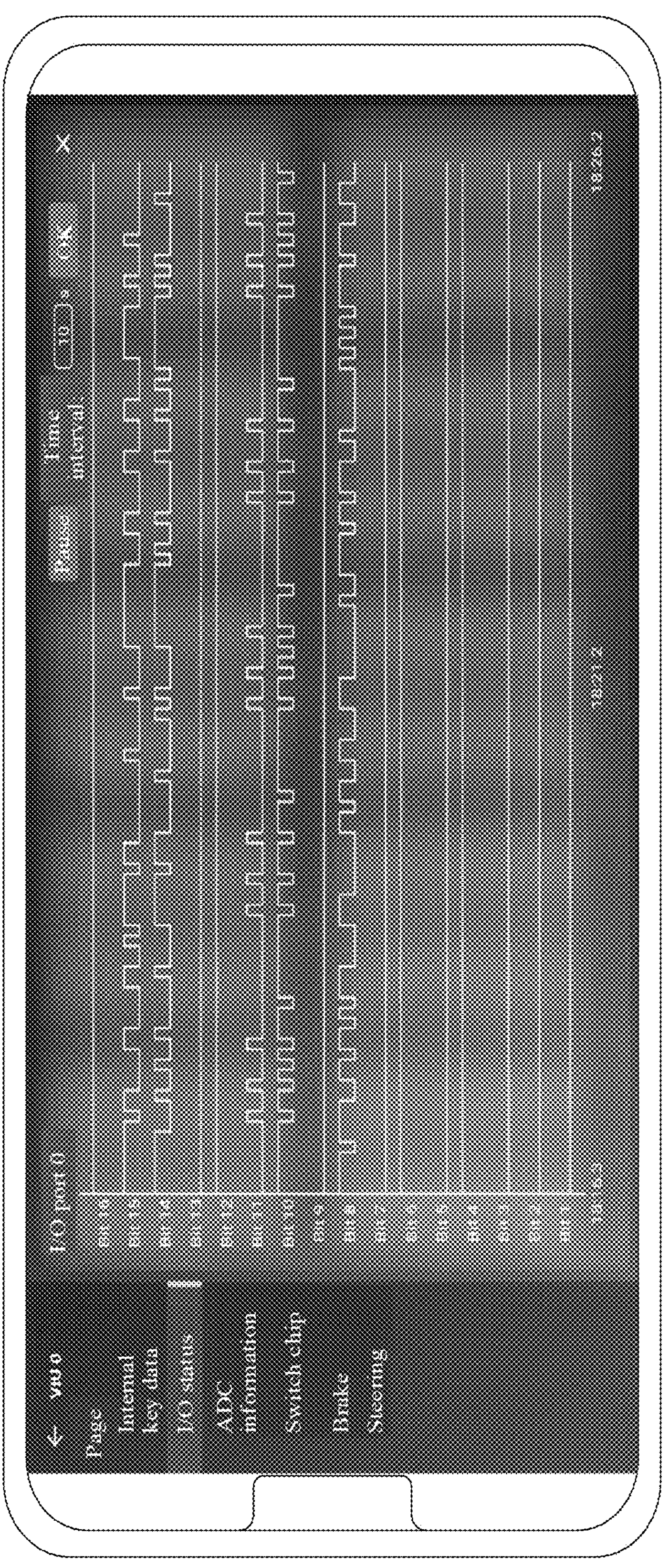
FIG. 15 is a schematic diagram of a display interface of another GUI according to this application.

As shown in FIG. 15, a status change of each I/O interface in each group of I/O ports may be drawn in a form of a square wave. An I/O port group 0 is used as an example. Square waves corresponding to change statuses of the I/O port in a period of time are displayed on the display screen in response to an operation of selecting the I/O port group 0 by the user.

Figure 16:
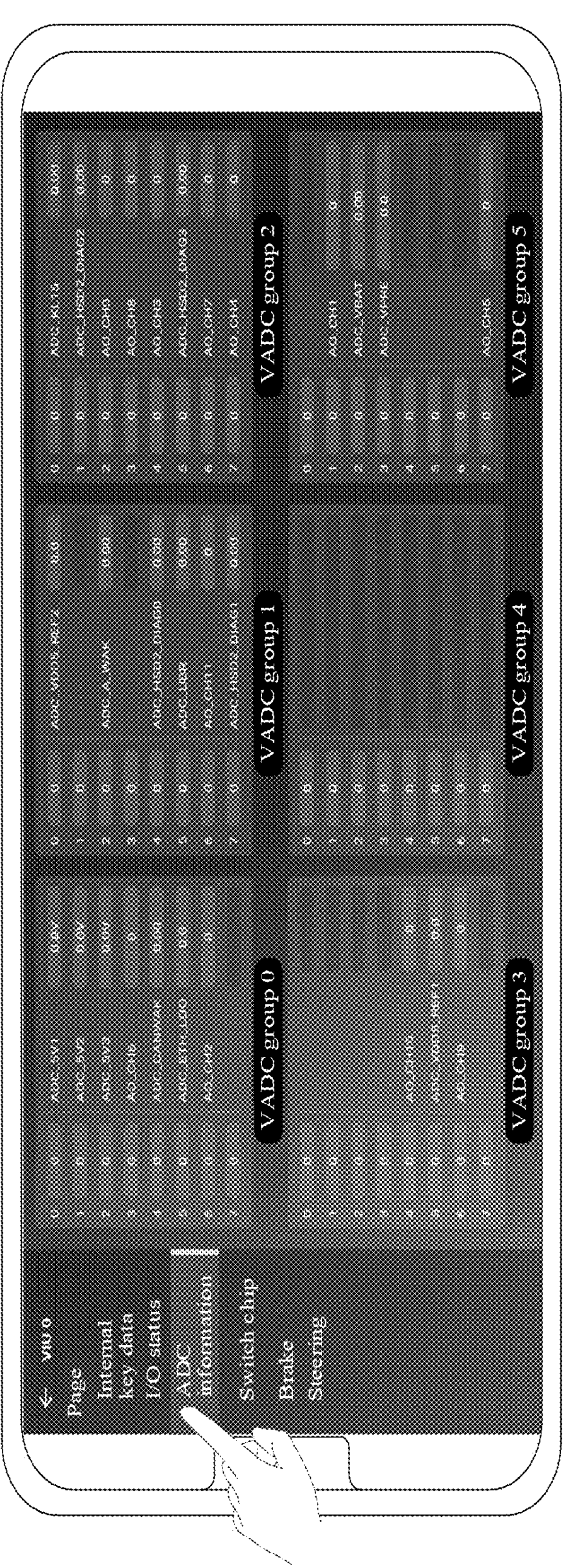
FIG. 16 is a schematic diagram of a display interface of another GUI according to this application.

As shown in FIG. 16, information corresponding to all groups of ADCs (that is, a VADC group 0 to a VADC group 5 in FIG. 16) may be displayed in a form of a list. In each group of ADC modules, the left column shows received original sampling values of the ADCs, and the right column shows calculated actual values of the ADCs.

Figure 17:
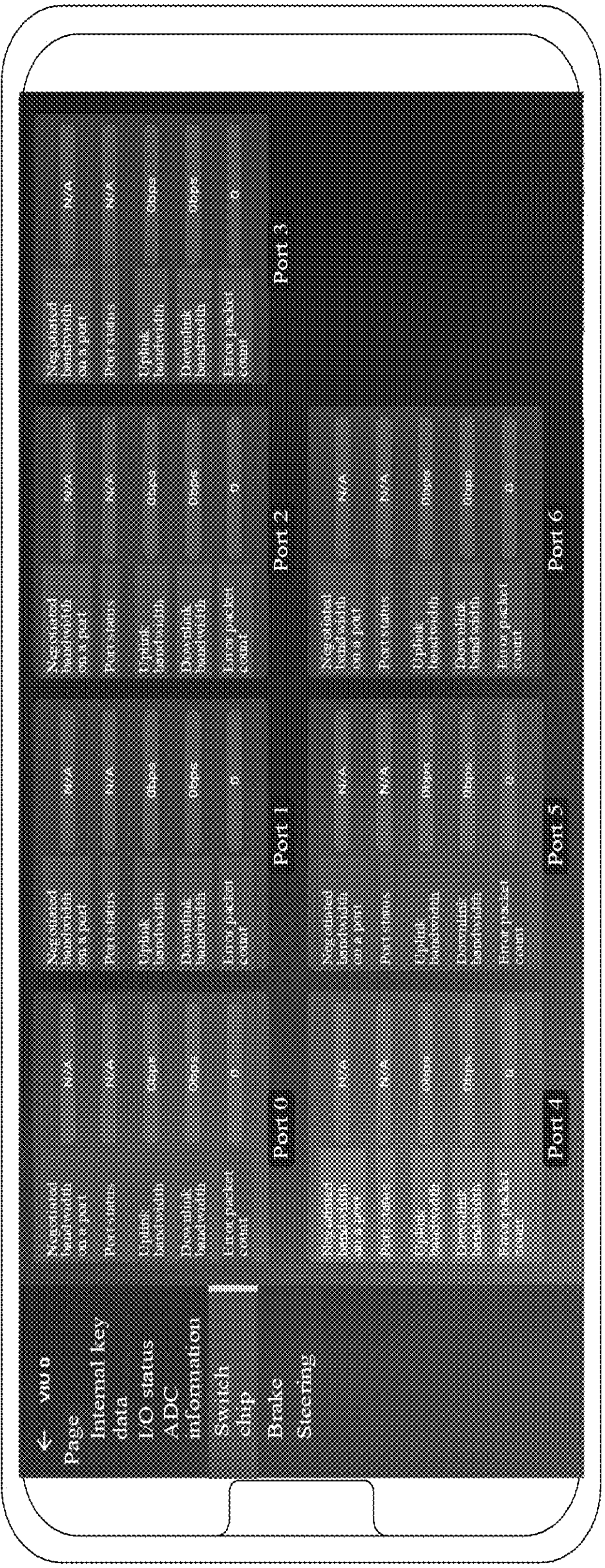
FIG. 17 is a schematic diagram of a display interface of another GUI according to this application.
Figure 18:
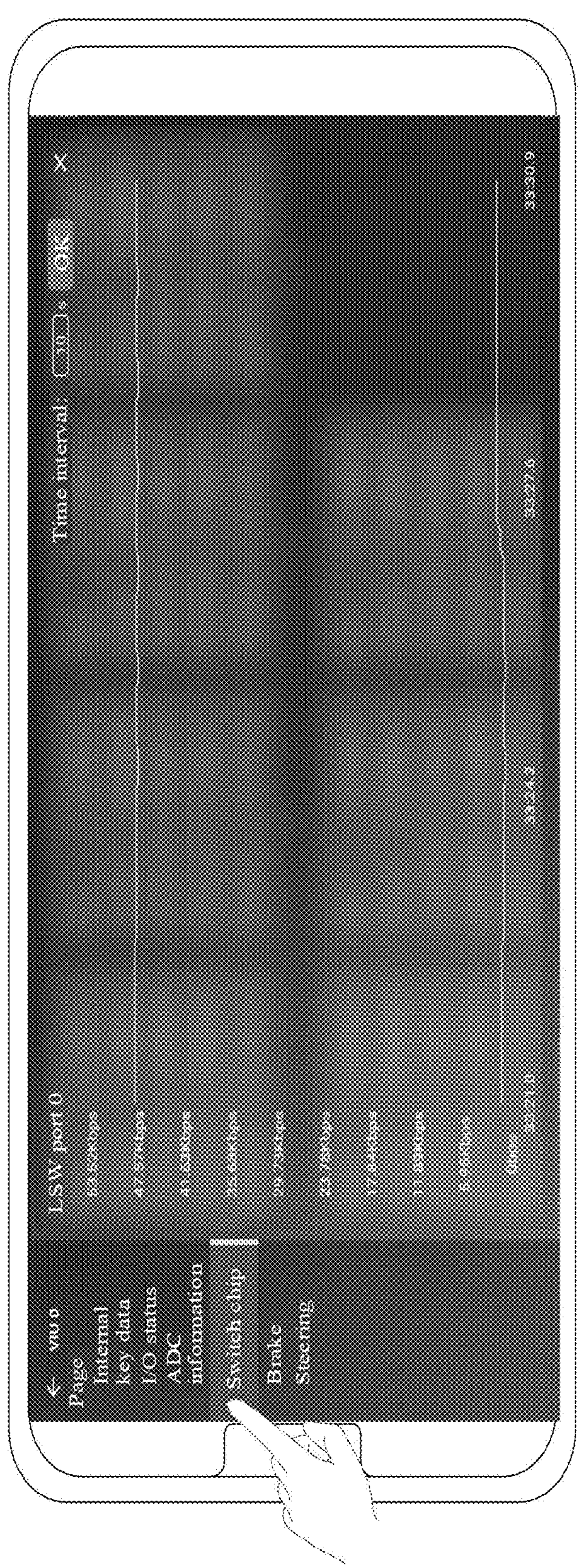
FIG. 18 is a schematic diagram of a display interface of another GUI according to this application.

As shown in FIG. 17, information monitored by an LSW chip may be displayed on the display screen in a form of a list, including negotiated bandwidth, a link status, and an error packet count that are on each of eight LSW chip ports (Port) and that are obtained by using a UDP packet decoder, and uplink and downlink real-time bandwidth that are on each of the eight ports and that are obtained by using a bandwidth calculation processor. As shown in FIG. 18, curves corresponding to the uplink bandwidth and the downlink bandwidth that correspond to a module on each port may be drawn. A port 0 is used as an example. Change curves of an uplink bandwidth and a downlink bandwidth on the port 0 in a period of time may be displayed on the display screen.

Figure 19:
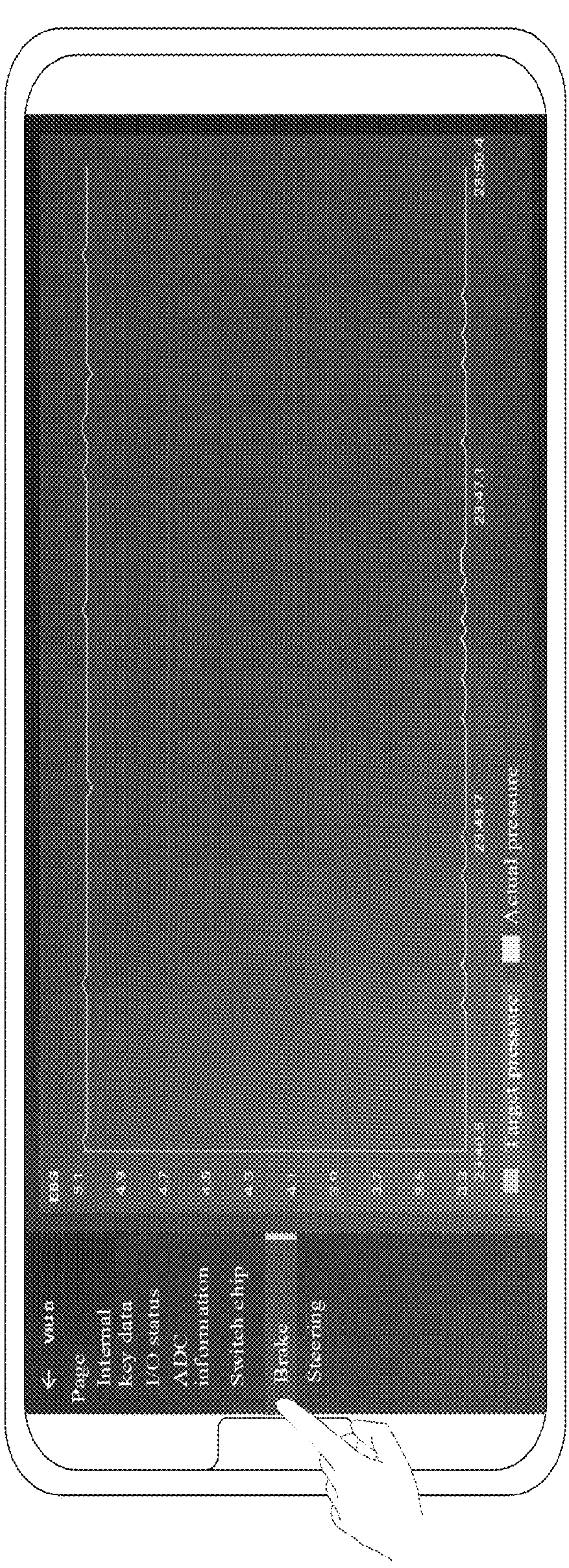
FIG. 19 is a schematic diagram of a display interface of another GUI according to this application.

As shown in FIG. 19, curves of a target pressure and an actual pressure of a brake pedal of a vehicle in a period of time may be drawn. Therefore, a specified pressure and an actual pressure of the brake pedal of the vehicle may be compared, to adjust an algorithm corresponding to the brake pedal, so that a difference between the target pressure and the actual pressure of the brake pedal becomes smaller.

Figure 20:
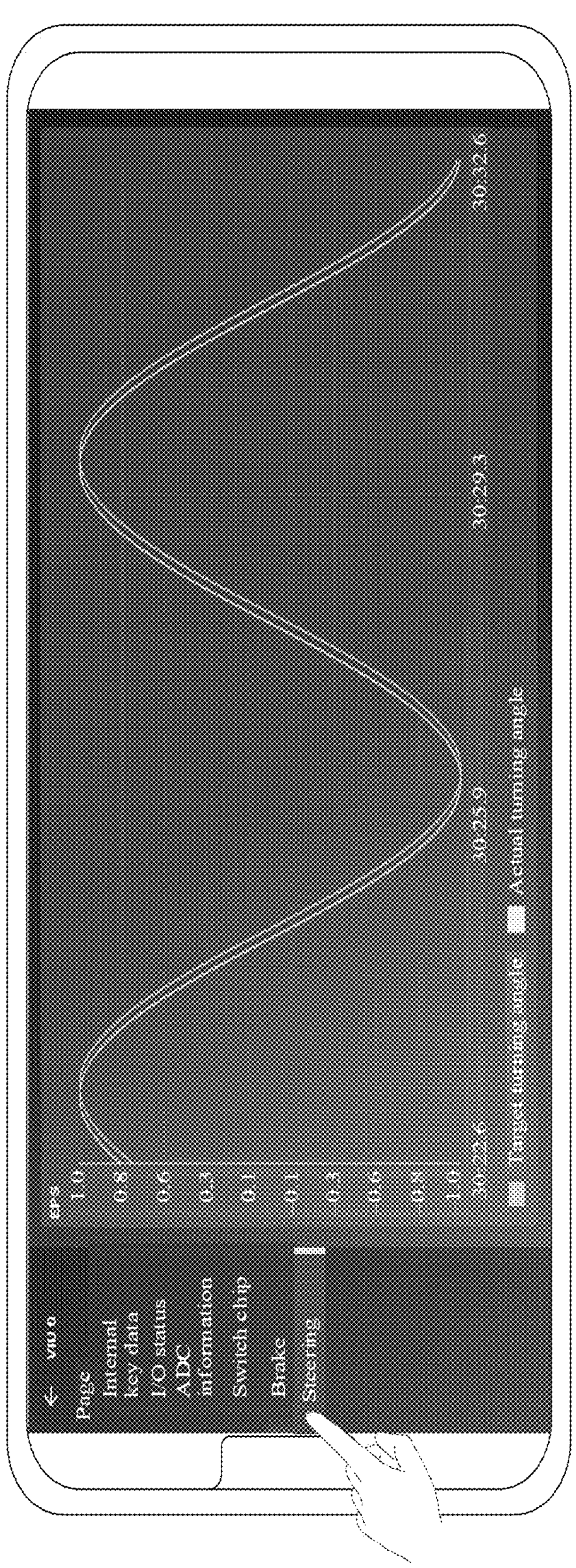
FIG. 20 is a schematic diagram of a display interface of another GUI according to this application.

As shown in FIG. 20, curves of a target turning angle and an actual turning angle of a steering system of a vehicle in a period of time may be drawn. For example, in an autonomous driving scenario, when a travel path is planned for the vehicle, the target turning angle may be planned for the vehicle, and the actual turning angle obtained when the vehicle travels may be detected, so that the travel path can be more accurately planned for the vehicle subsequently based on a difference between the actual turning angle and the target turning angle.

In addition, the control device may store the received multicast packet or the data included in the multicast packet, and may subsequently obtain historical data of each VIU in the vehicle by reading the historical data, to more accurately analyze each module of the vehicle subsequently, and obtain a historical status change of the vehicle through analysis, such as baseline drift of the sensor or sensitivity adjustment of the brake pedal. For example, the display interface of the GUI may further include a historical data module. In response to an operation of selecting the historical data module by the user, historical data may be read from a local storage medium or a database, and the historical data may be displayed.

Therefore, in the GUI provided in this application, each VIU in the vehicle can be finely monitored, and a status of each input/output point in a current system and an instant value of a specified intermediate variable can be monitored. In addition, an intermediate status of each layer of a system function can be monitored and controlled through intervention. This improves vehicle control accuracy and improves user experience.

The foregoing describes in detail the method, the system, and the GUI provided in this application. The following describes, based on FIG. 1 to FIG. 20, an apparatus provided in this application.

It should be understood that the VIU and the control device provided in this application may be applied to a vehicle. The vehicle includes at least one vehicle integration unit VIU, the VIU is any one of the at least one VIU, a communication connection is established between the at least one VIU and the control device, and the control device and the at least one VIU access a same multicast group. The control device may be included in the vehicle, or a communication connection may be established between the control device and the vehicle. Specifically, the control device may be adjusted based on an actual application scenario. This is not limited herein.

The following separately describes a VIU and a control device provided in this application. The VIU and the control device are respectively configured to perform the steps performed by the VIU and the control device in FIG. 5 or FIG. 6.

Figure 21:
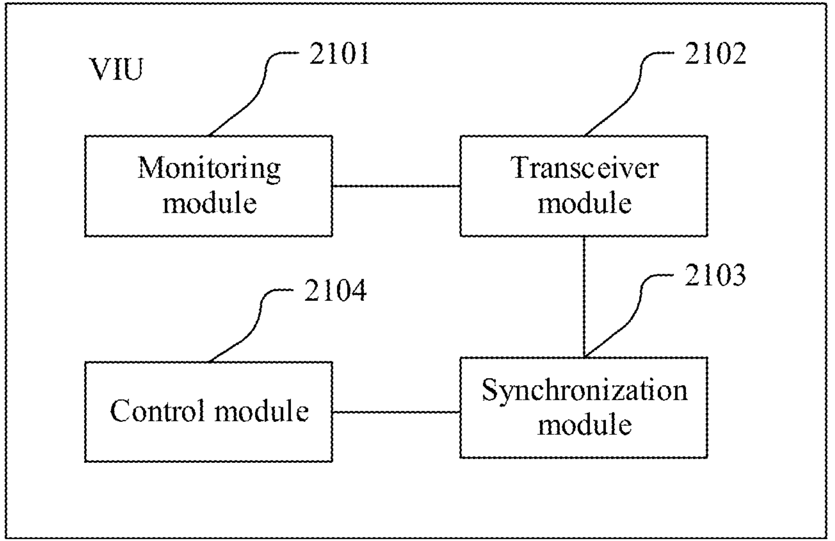
FIG. 21 is a schematic structural diagram of a VIU according to this application.

FIG. 21 is a schematic structural diagram of a VIU according to this application.

The VIU may include: a monitoring module 2101, configured to obtain monitored information; and a transceiver module 2102, configured to transmit a multicast packet by using a multicast group, so that a control device obtains the multicast packet by monitoring the multicast group, where the multicast packet includes the information detected by the first VIU, and the multicast packet is used by the control device to analyze a status of a vehicle.

In a possible implementation, an Ethernet connection and/or a wireless communication connection is established between the control device and at least one VIU.

The transceiver module 2102 is specifically configured to transmit the multicast packet in the multicast group through the Ethernet connection and/or the wireless connection.

In a possible implementation, the vehicle includes at least two VIUs, and before the first VIU transmits the multicast packet to the multicast group, the VIU may further include a synchronization module 2103, configured to perform time synchronization with a VIU in the at least two VIUs other than the VIU.

The transceiver module 2102 is specifically configured to send the multicast packet based on a time axis obtained after the time synchronization.

In a possible implementation, the transceiver module is specifically configured to periodically send the multicast packet.

In a possible implementation, the information monitored by the monitoring module 2101 includes one or more of the following: status information of the VIU, information about an I/O interface of the VIU, an original sampling value of an ADC of the VIU, or information collected by a sensor monitored by the VIU.

In a possible implementation, the information collected by the sensor is used by the control device to plan a travel path for the vehicle.

In a possible implementation, before the transceiver module 2102 transmits the multicast packet to the multicast group, the transceiver module 2102 is further configured to: receive a join request sent by the control device, where the join request is used to request to join the multicast group; and reply to the join request with a multicast address, so that the control device joins the multicast group based on the multicast address, monitors a port corresponding to the multicast address, and receives the multicast packet.

In a possible implementation, the VIU may further include a control module 2104. The transceiver module is further configured to receive a control instruction sent by the control device. The control module 2104 is configured to control one or more of the I/O interface of the first VIU, the sensor, or an executor of the vehicle according to the control instruction.

Figure 22:
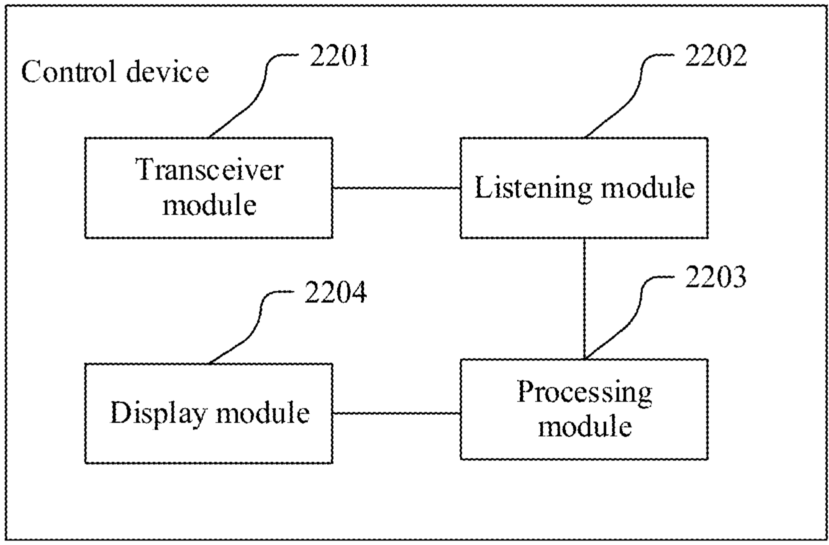
FIG. 22 is a schematic structural diagram of a control device according to this application.

FIG. 22 is a schematic structural diagram of a control device according to this application.

The control device includes: a transceiver module 2201, configured to obtain a multicast address of a multicast group; a monitoring module 2202, configured to monitor, by the control device, a port corresponding to the multicast address, where the transceiver module 2201 is further configured to obtain at least one frame of multicast packet through the port, where the multicast packet includes information monitored by at least one VIU; and a processing module 2203, configured to analyze a status of a vehicle by using the at least one frame of multicast packet.

In a possible implementation, an Ethernet connection and/or a wireless connection is established between the control device and the at least one VIU.

The transceiver module 2201 is specifically configured to receive, through the Ethernet connection and/or the wireless connection, the multicast packet transmitted in the multicast group.

In a possible implementation, the at least one frame of multicast packet includes one or more of the following: status information of the at least one VIU, information about an I/O interface of the at least one VIU, an original sampling value of an ADC of the at least one VIU, or information collected by a sensor monitored by the at least one VIU.

In a possible implementation, when the at least one frame of multicast packet includes the information collected by the sensor monitored by the at least one VIU, the processing module 2203 is further configured to plan, by the control device, a travel path for the vehicle based on the information collected by the sensor monitored by the at least one VIU.

In a possible implementation, the transceiver module 2201 is specifically configured to periodically receive, through the port, the at least one frame of multicast packet transmitted by the at least one VIU to the multicast group.

In a possible implementation, the transceiver module 2201 is further configured to: send a join request to a first VIU, where the join request is used to request to join the multicast group, and the first VIU is any one of the at least one VIU; and receive the multicast address with which the first VIU replies.

In a possible implementation, the control device further includes a display module 2204.

After the control device analyzes the status of the vehicle by using the at least one frame of multicast packet, the processing module 2203 is further configured to generate an analysis image based on a change of the status of the vehicle with time.

The display module 2204 is configured to display the analysis image.

In a possible implementation, the transceiver module 2201 is further configured to send a control instruction to the at least one VIU, where the control instruction is used to control one or more of the I/O interface of the at least one VIU, the sensor, or an executor.

Figure 23:
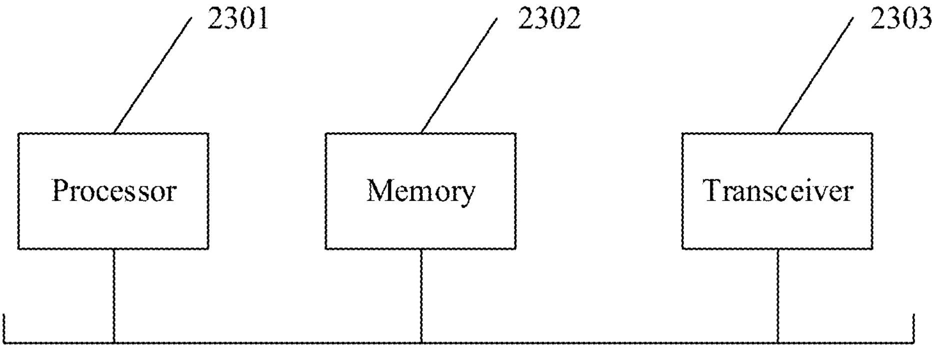
FIG. 23 is a schematic structural diagram of another VIU according to this application.

FIG. 23 is a schematic structural diagram of another VIU according to this application. Details are as follows:

The VIU may include a processor 2301, a transceiver 2303, and a memory 2302. The processor 2301, the transceiver 2303, and the memory 2302 are interconnected through a line. The memory 2302 stores program instructions and data.

The memory 2302 stores the program instructions and the data that correspond to the steps in FIG. 5 to FIG. 10B.

The processor 2301 is configured to perform the method steps performed by the VIU in any one of the foregoing embodiments in FIG. 5 to FIG. 10B.

Optionally, the VIU may further include the transceiver 2303, configured to: receive or send data.

An embodiment of this application further provides a computer readable storage medium. The computer readable storage medium stores a program used to generate a vehicle travel speed. When the program runs on a computer, the computer is enabled to perform the steps in the methods described in the embodiments shown in FIG. 5 to FIG. 10B.

Optionally, the VIU shown in FIG. 23 is a chip.

Figure 24:
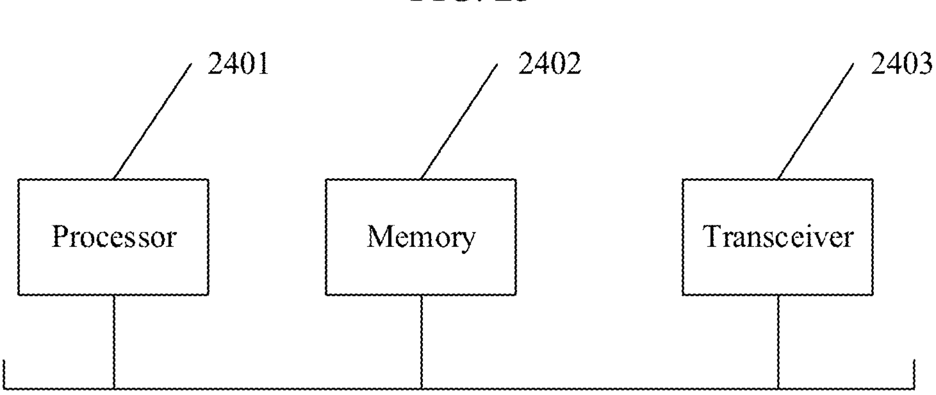
FIG. 24 is a schematic structural diagram of another control device according to this application.

FIG. 24 is a schematic structural diagram of another control device according to this application. Details are as follows:

The control device may include a processor 2401, a transceiver 2403, and a memory 2402. The processor 2401, the transceiver 2403, and the memory 2402 are interconnected through a line. The memory 2402 stores program instructions and data.

The memory 2402 stores the program instructions and the data that correspond to the steps in FIG. 5 to FIG. 10B.

The processor 2401 is configured to perform the method steps performed by the control device in any one of the foregoing embodiments in FIG. 5 to FIG. 10B.

Optionally, the control device may further include the transceiver 2403, configured to: receive or send data.

An embodiment of this application further provides a computer readable storage medium. The computer readable storage medium stores a program used to generate a vehicle travel speed. When the program runs on a computer, the computer is enabled to perform the steps in the methods described in the embodiments shown in FIG. 5 to FIG. 10B.

Optionally, the control device shown in FIG. 24 is a chip.

An embodiment of this application further provides a VIU. The VIU may also be referred to as a digital processing chip or a chip. The chip includes a processing unit and a communications interface. The processing unit obtains program instructions through the communications interface, and when the program instructions are executed by the processing unit, the processing unit is configured to perform the method steps performed by the VIU in any one of the foregoing embodiments in FIG. 5 to FIG. 10B.

An embodiment of this application further provides a control device. The control device may also be referred to as a digital processing chip or a chip. The chip includes a processing unit and a communications interface. The processing unit obtains program instructions through the communications interface, and when the program instructions are executed by the processing unit, the processing unit is configured to perform the method steps performed by the control device in any one of the foregoing embodiments in FIG. 5 to FIG. 10B.

An embodiment of this application further provides a digital processing chip. A circuit and one or more interfaces that are configured to implement the processor 2301 or a function of the processor 2301 are integrated into the digital processing chip. When a memory is integrated into the digital processing chip, the digital processing chip may complete the method steps in any one or more of the foregoing embodiments. When a memory is not integrated into the digital processing chip, the digital processing chip may be connected to an external memory through a communications interface. The digital processing chip implements, based on program code stored in the external memory, the actions performed by the VIU in the foregoing embodiments.

An embodiment of this application further provides a digital processing chip. A circuit and one or more interfaces that are configured to implement the processor 2401 or a function of the processor 2401 are integrated into the digital processing chip. When a memory is integrated into the digital processing chip, the digital processing chip may complete the method steps in any one or more of the foregoing embodiments. When a memory is not integrated into the digital processing chip, the digital processing chip may be connected to an external memory through a communications interface. The digital processing chip implements, based on program code stored in the external memory, the actions performed by the control device in the foregoing embodiments.

An embodiment of this application further provides a computer program product. When the computer program product runs on a computer, the computer is enabled to perform the steps performed by the VIU in the methods described in the embodiments shown in FIG. 5 to FIG. 10B.

A data transmission apparatus provided in an embodiment of this application may be a chip. The chip includes a processing unit and a communications unit. The processing unit may be, for example, a processor, and the communications unit may be, for example, an input/output interface, a pin, or a circuit. The processing unit may execute computer executable instructions stored in a storage unit, so that the chip in a server performs the data transmission methods described in the embodiments shown in FIG. 5 to FIG. 10B. Optionally, the storage unit is a storage unit in the chip, for example, a register or a buffer, or the storage unit may be a storage unit that is in a radio access device end and that is located outside the chip, for example, a read-only memory (ROM), another type of static storage device that can store static information and instructions, or a random access memory (RAM).

Specifically, the processing unit or the processor may be a central processing unit (CPU), a network processor (NPU), a graphics processing unit (GPU), a digital signal processor (DSP), an application-specific integrated circuit (ASIC), a field-programmable gate array (FPGA), another programmable logic device, a discrete gate, a transistor logic device, a discrete hardware component, or the like. A general-purpose processor may be a microprocessor, or may be any conventional processor, or the like.

Figure 25:
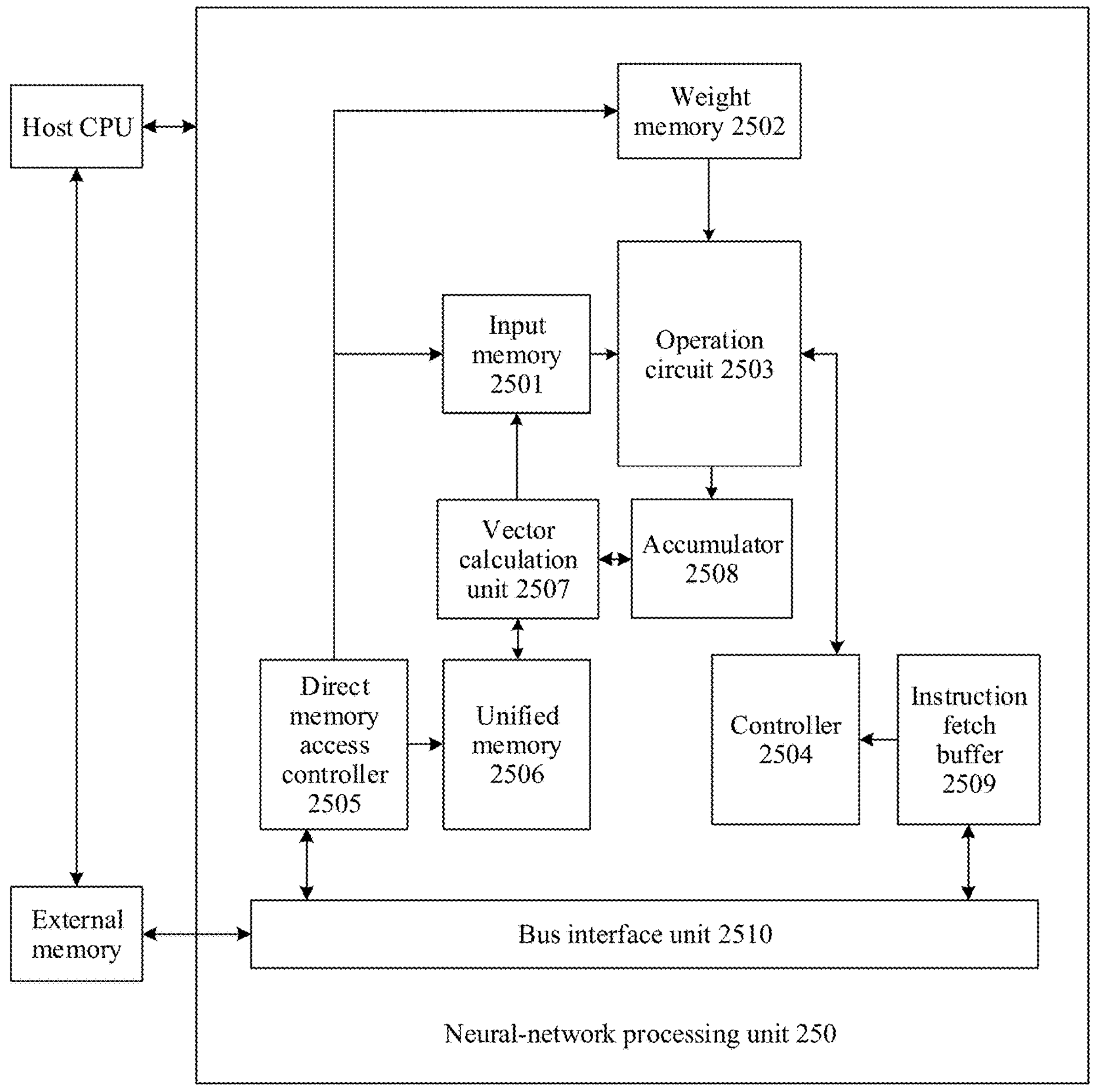
FIG. 25 is a schematic structural diagram of a chip according to this application.

For example, FIG. 25 is a schematic structural diagram of a chip according to an embodiment of this application. The chip may be represented as a neural-network processing unit NPU 250. The NPU 250 is mounted to a host CPU (Host CPU) as a coprocessor, and the host CPU allocates a task. A core part of the NPU is an operation circuit 2503. The operation circuit 2503 is controlled by a controller 2504 to extract matrix data in a memory and perform a multiplication operation.

In some implementations, the operation circuit 2503 includes a plurality of processing units or process engines (PEs). In some implementations, the operation circuit 2503 is a two-dimensional systolic array. The operation circuit 2503 may alternatively be a one-dimensional systolic array or another electronic circuit that can perform mathematical operations such as multiplication and addition. In some implementations, the operation circuit 2503 is a general-purpose matrix processor.

For example, it is assumed that there are an input matrix A, a weight matrix B, and an output matrix C. The operation circuit fetches data corresponding to the matrix B from a weight memory 2502, and buffers the data on each PE of the operation circuit. The operation circuit fetches data corresponding to the matrix A from an input memory 2501, performs a matrix operation on the matrix B, and stores an obtained intermediate result or an obtained final result of the matrix in an accumulator 2508.

A unified memory 2506 is configured to store input data and output data. Weight data is directly transferred to the weight memory 2502 by using a direct memory access controller (DMAC) 2505. The input data is also transferred to the unified memory 2506 by using the DMAC.

A bus interface unit (BIU) 2510 is configured to interact with the DMAC and an instruction fetch buffer (IFB) 2509 through an AXI bus.

The BIU 2510 is used by the instruction fetch buffer 2509 to obtain instructions from an external memory, and is further used by the direct memory access controller 2505 to obtain original data corresponding to the input matrix A or the weight matrix B from the external memory.

The DMAC is mainly configured to transfer input data in the external memory DDR to the unified memory 2506, transfer weight data to the weight memory 2502, or transfer input data to the input memory 2501.

A vector calculation unit 2507 includes a plurality of operation processing units; and if necessary, performs further processing such as vector multiplication, vector addition, an exponential operation, a logarithmic operation, or value comparison on an output of the operation circuit. The vector calculation unit 2507 is mainly configured to perform network calculation at a non-convolutional/fully connected layer in a neural network, for example, batch normalization (batch normalization), pixel-level summation, and upsampling on a feature plane.

In some implementations, the vector calculation unit 2507 can store a processed output vector in the unified memory 2506. For example, the vector calculation unit 2507 may apply a linear function and/or a non-linear function to the output of the operation circuit 2503, for example, perform linear interpolation on a feature plane extracted at a convolutional layer, and for another example, accumulate vectors of values to generate an activation value. In some implementations, the vector calculation unit 2507 generates a normalized value, a value obtained through pixel-level summation, or a combination thereof. In some implementations, the processed output vector can be used as an activation input to the operation circuit 2503, for example, used at a subsequent layer in the neural network.

The instruction fetch buffer 2509 connected to the controller 2504 is configured to store instructions used by the controller 2504.

The unified memory 2506, the input memory 2501, the weight memory 2502, and the instruction fetch buffer 2509 are all on-chip memories. The external memory is private to a hardware architecture of the NPU.

An operation at each layer in the recurrent neural network may be performed by the operation circuit 2503 or the vector calculation unit 2507.

The processor mentioned above may be a general-purpose central processing unit, a microprocessor, an ASIC, or one or more integrated circuits for controlling program execution of the methods in FIG. 5 to FIG. 10B.

In addition, it should be noted that the described apparatus embodiments are merely examples. The units described as separate parts may or may not be physically separate, and parts displayed as units may or may not be physical units, and may be located in one position, or may be distributed on a plurality of network units. Some or all of the modules may be selected based on an actual requirement to achieve the objectives of the solutions of the embodiments. In addition, in the accompanying drawings of the apparatus embodiments provided in this application, connection relationships between modules indicate that the modules have communication connections with each other, which may be specifically implemented as one or more communications buses or signal cables.

Based on the descriptions of the foregoing implementations, a person skilled in the art may clearly understand that this application may be implemented by software and necessary universal hardware, or certainly may be implemented by dedicated hardware, including a dedicated integrated circuit, a dedicated CPU, a dedicated memory, a dedicated component, and the like. Usually, all functions completed by a computer program may be easily implemented by using corresponding hardware, and a specific hardware structure used to implement a same function may also be of various forms, for example, a form of an analog circuit, a digital circuit, or a dedicated circuit. However, in this application, a software program implementation is a better implementation in most cases. Based on such an understanding, the technical solutions of this application may be implemented in a form of a software product. The computer software product is stored in a readable storage medium, such as a floppy disk, a USB flash drive, a removable hard disk, a read-only memory (ROM), a random-access memory (RAM), a magnetic disk, or an optical disc of a computer, and includes several instructions for instructing a computer device (which may be a personal computer, a server, a network device, or the like) to perform the methods described in the embodiments of this application.

All or some of the foregoing embodiments may be implemented by using software, hardware, firmware, or any combination thereof. When software is used to implement the embodiments, all or some of the embodiments may be implemented in a form of a computer program product.

The computer program product includes one or more computer instructions. When the computer program instructions are loaded and executed on the computer, all or some of the procedures or the functions according to the embodiments of this application are generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD), a semiconductor medium (for example, a solid-state drive (SSD)), or the like.

In the specification, claims, and accompanying drawings of this application, the terms “first”, “second”, “third”, “fourth”, and the like (if existent) are intended to distinguish between similar objects but do not necessarily indicate a specific order or sequence. It should be understood that the data termed in such a way are interchangeable in appropriate circumstances, so that the embodiments described herein can be implemented in an order other than the order illustrated or described herein. In addition, the terms “include”, “have”, and any other variants mean to cover the non-exclusive inclusion, for example, a process, method, system, product, or device that includes a list of steps or units is not necessarily limited to those expressly listed steps or units, but may include other steps or units that are not expressly listed or inherent to such a process, method, product, or device.

What is claimed is:

1. A data transmission method, comprising:

obtaining, by a first node of one or more nodes of a vehicle that are in a same multicast group as a control device, monitored information comprising an original sampling value of an analog-to-digital converter (ADC) of the first node at a particular moment or during a particular period of time;

obtaining, by the first node, a multicast packet that comprises the monitored information and that is for analyzing a status of the vehicle;

transmitting, by the first node, the multicast packet through the multicast group;

obtaining, by the control device, at least one frame of the multicast packet through the multicast group, wherein the at least one frame comprises the original sampling value;

calculating, by the control device, an actual ADC value by multiplying the original sampling value by a voltage division coefficient; and analyze the status of the vehicle using the at least one frame and the actual ADC value.

2. The data transmission method of claim 1, wherein the one or more nodes are at least one vehicle integration unit (VIU), and wherein the first node is a first VIU of the at least one VIU.

3. The data transmission method of claim 1, wherein the one or more nodes comprise at least two nodes, wherein before transmitting the multicast packet through the multicast group, the data transmission method further comprises:

performing, by the first node, time synchronization with a second node in the at least two nodes other than the first node; and wherein transmitting the multicast packet through the multicast group comprises sending, by the first node, the multicast packet based on a time axis obtained after the time synchronization.

4. The data transmission method of claim 1, wherein transmitting the multicast packet through the multicast group comprises periodically sending, by the first node, the multicast packet.

5. The data transmission method of claim 1, wherein the monitored information further comprises one or more of status information of the first node, first information about an input/output (I/O) interface of the first node, or second information collected by a sensor monitored by the first node.

6. The data transmission method of claim 1, wherein before transmitting the multicast packet, the data transmission method further comprises:

receiving, by the first node and from the control device, a join request for requesting to join the multicast group; and replying, by the first node, to the join request with a multicast address.

7. The data transmission method of claim 1, wherein the data transmission method further comprises:

receiving, by the first node, a control instruction from the control device; and controlling, by the first node and according to the control instruction, one or more of an input/output (I/O) interface of the first node, a sensor, or an operation of the vehicle.

8. A data transmission method comprising:

obtaining, by a control device of a vehicle and through a multicast group that comprises the control device and one or more nodes, at least one frame of a multicast packet from a first node in the one or more nodes, wherein the at least one frame comprises an original sampling value of an analog-to-digital converter (ADC) of the one or more nodes;

calculating an actual ADC value by multiplying the original sampling value by a voltage division coefficient; and analyzing, by the control device, a status of the vehicle using the at least one frame and the actual ADC value.

9. The data transmission method of claim 8, wherein the data transmission method further comprises obtaining, by the control device, a multicast address of the multicast group, and wherein obtaining the at least one frame comprises:

monitoring a port corresponding to the multicast address; and obtaining the at least one frame through the port.

10. The data transmission method of claim 8, wherein the one or more nodes are at least one vehicle integration unit (VIU), and wherein the first node is a first VIU of the at least one VIU.

11. The data transmission method of claim 8, wherein the at least one frame further comprises one or more of status information of the one or more nodes, first information about an input/output (I/O) interface of the one or more nodes, or second information collected by a sensor monitored by the one or more nodes.

12. The data transmission method of claim 8, wherein obtaining the at least one frame through the multicast group comprises periodically receiving, by the control device through the multicast group, the at least one frame.

13. The data transmission method of claim 9, wherein obtaining the multicast address comprises:

sending, by the control device and to the first node, a join request for requesting to join the multicast group; and receiving, by the control device in response to the join request, the multicast address.

14. The data transmission method of claim 8, wherein after analyzing the status, the data transmission method further comprises:

generating, by the control device, an analysis image based on a change of the status of the vehicle with time; and displaying the analysis image.

15. A first apparatus, comprising:

a memory configured to store instruction; and one or more processors coupled to the memory and configured to execute the instructions to implement one or more nodes that are in a same multicast group as a control device and that comprise a first node that is configured to:

obtain monitored information comprising an original sampling value of an analog-to-digital converter (ADC) of the first apparatus at a particular moment or during a particular period of time;

obtain a multicast packet that comprises the monitored information and that is for analyzing a status of a vehicle; and transmit the multicast packet through the multicast group, wherein the control device is configured to:

obtain at least one frame of the multicast packet through the multicast group, wherein the at least one frame comprises the original sampling value;

calculate an actual ADC value by multiplying the original sampling value by a voltage division coefficient; and analyze the status of the vehicle using the at least one frame and the actual ADC value.

16. The first apparatus of claim 15, wherein the one or more nodes are at least one vehicle integration unit (VIU), and wherein the first node is a first VIU of the at least one VIU.

17. The first apparatus of claim 15, wherein the one or more nodes further comprise a second node, and wherein the first node is further configured to:

perform time synchronization with the second node; and send the multicast packet based on a time axis obtained after the time synchronization.

18. The first apparatus of claim 15, wherein the first node is configured to periodically send the multicast packet.

19. The first apparatus of claim 15, wherein the monitored information further comprises one or more of status information of the first apparatus, first information about an input/output (I/O) interface of the first apparatus, or second information collected by a sensor monitored by the first apparatus.

20. The first apparatus of claim 15, wherein the first node is further configured to:

receive, from the control device, a join request for requesting to join the multicast group; and reply to the join request with a multicast address.

21. The first apparatus of claim 15, wherein the first node is further configured to:

receive a control instruction from the control device; and control, according to the control instruction, one or more of an input/output (I/O) interface of the first apparatus, a sensor, or an execution of the vehicle.

22. An apparatus, comprising:

a memory configured to store instructions; and one or more processors coupled to the memory and configured to execute the instructions to implement a control device that is in a same multicast group as one or more nodes and that is configured to:

obtain, through the multicast group, at least one frame of multicast packet that comprises information from a first node in the one or more nodes, wherein the at least one frame comprises an original sampling value of an analog-to-digital converter (ADC) of the one or more nodes;

calculate an actual ADC value by multiplying the original sampling value by a voltage division coefficient; and analyze a status of a vehicle using the at least one frame and the actual ADC value.

23. The apparatus of claim 22, wherein the control device is further configured to:

obtain a multicast address of the multicast group;

monitor a port corresponding to the multicast address; and obtain the at least one frame through the port.

24. The apparatus of claim 22, wherein the one or more nodes are at least one vehicle integration unit (VIU), and wherein the first node is a first VIU of the at least one VIU.

25. The apparatus of claim 22, wherein the at least one frame further comprises one or more of status information of the one or more nodes, first information about an input/output (I/O) interface of the one or more nodes, or second information collected by a sensor monitored by the one or more nodes.

26. The apparatus of claim 22, wherein the control device is configured to periodically receive through the multicast group the at least one frame.

27. The apparatus of claim 23, wherein the control device is further configured to:

send, to the first node, a join request for requesting to join the multicast group; and receive the multicast address.

28. The apparatus of claim 22, wherein the control device is further configured to:

generate an analysis image based on a change of the status of the vehicle with time; and display the analysis image.

29. A communication system, comprising:

a control device; and at least one apparatus that is communicatively coupled to the control device, is in a same multicast group as the control device, and is configured to:

obtain monitored information comprising an original sampling value of an analog-to-digital converter (ADC) of the communication system at a particular moment or during a particular period of time;

obtain a multicast packet that comprises the monitored information; and transmit the multicast packet through the multicast group, wherein the control device is configured to:

obtain at least one frame of the multicast packet through the multicast group, wherein the at least one frame comprises the original sampling value;

calculate an actual ADC value by multiplying the original sampling value by a voltage division coefficient; and analyze a status of a vehicle using the at least one frame and the actual ADC value.

* * * * *